(12) United States Patent
Sugiyama et al.

(10) Patent No.: US 7,177,095 B2
(45) Date of Patent: Feb. 13, 2007

(54) ZOOM LENS AND IMAGING APPARATUS HAVING THE SAME

(75) Inventors: Takayuki Sugiyama, Utsunomiya (JP);
Nobuyuki Tochigi, Utsunomiya (JP);
Motomu Fukasawa, Tokorozawa (JP);
Kazuyuki Kondo, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/250,016

(22) Filed: Oct. 12, 2005

(65) Prior Publication Data

US 2006/0082900 A1 Apr. 20, 2006

(30) Foreign Application Priority Data

Oct. 19, 2004 (JP) .............................. 2004-304217

(51) Int. Cl.
*G02B 15/14* (2006.01)
(52) U.S. Cl. ....................................... 359/689; 359/686
(58) Field of Classification Search ................ 359/683, 359/686, 689
See application file for complete search history.

(56) References Cited

U.S. PATENT DOCUMENTS

| | | | |
|---|---|---|---|
| 5,268,792 A | 12/1993 | Kreitzer | |
| 5,283,693 A | 2/1994 | Kohno | |
| 5,289,317 A * | 2/1994 | Ikemori et al. | 359/689 |
| 5,357,374 A | 10/1994 | Ohno | |
| 5,539,582 A * | 7/1996 | Kohno et al. | 359/689 |
| 6,081,389 A * | 6/2000 | Takayama et al. | 359/680 |
| 6,618,210 B2 | 9/2003 | Noguchi | |
| 6,917,476 B2 | 7/2005 | Eguchi | |
| 2002/0196559 A1* | 12/2002 | Eguchi | 359/689 |
| 2004/0263997 A1* | 12/2004 | Noda | 359/689 |
| 2005/0286139 A1* | 12/2005 | Nishimura | 359/686 |

FOREIGN PATENT DOCUMENTS

| | | | |
|---|---|---|---|
| JP | 2003-177314 A | 6/2003 | |
| JP | 2004-004765 A | 1/2004 | |

\* cited by examiner

*Primary Examiner*—Scott J. Sugarman
(74) *Attorney, Agent, or Firm*—Canon USA, Inc. Intellectual Property Division

(57) ABSTRACT

A zoom lens comprises, from the object side to the image side, a first lens group, a second lens group, and a rear group including one or more lens groups, where the first and second lens groups can move at the time of zooming, and wherein the first lens group comprises, from the object side to the image side, a first lens of negative refractive power, and a second lens of positive refractive power.

23 Claims, 16 Drawing Sheets

ZOOM LENS AND IMAGING APPARATUS HAVING THE SAME

BACKGROUND OF THE INVENTION

1. Field of the Invention

The present invention relates to a zoom lens, and more particularly, though not exclusively, relates to a microminiature zoom lens.

2. Description of the Related Art

In recent years, optical equipment made up of an imaging module combined with a solid state imaging device such as a photographing lens, CCD, or CMOS is mounted on a portable terminal such as a cellular phone, and PDA. With such optical equipment, reduction in thickness of the entire equipment and in the imaging modules have been advanced to facilitate portability.

Conventional imaging modules, particularly imaging modules employed for cellular phones, mount a single-focus photographing lens, where reduction in thickness is readily realized with a relatively smaller number of lenses.

On the other hand, high-quality image technology has advanced, and cellular phones mounting an imaging device of 1 to 2 mega-pixels have appeared. Also, on the other hand, the desire has increased for zoom lenses as photographing lenses. As for zoom lenses corresponding to such small optical equipment, negative lens proactive type (negative lead) zoom lens systems where a negative lens is disposed on the object side have been discussed (Japanese Patent Laid-Open No. 2003-177314 (no corresponding overseas patent documents) and Japanese Patent Laid-Open No. 2004-4765 (no corresponding overseas patent documents)).

With Japanese Patent Laid-Open No. 2003-177314, a zoom lens made up of 3 lenses has been discussed where a 3-group configuration made up of negative, positive, and positive refractive power lens groups in order from the object side to the image side, the first and second lens groups are moved so as to reduce the interval between the first lens group and the second lens group, and increase the interval between the second lens group and the third lens group. Thus, reduction in size of the entire lens system is achieved by reducing the number of lenses.

Further, reduction in size of the entire lens system is realized while lengthening the exit pupil by configuring the third lens group with positive refractive power to be fixed at the time of zooming.

Also, Japanese Patent Laid-Open No. 2004-4765 discusses a zoom lens made up of three groups, and Japanese Patent Laid-Open No. 2003-177314 discusses a zoom lens made up of five or six lenses.

Upon light being cast into an imaging device with great deviance from vertical incidence, vignetting is caused due to the structure between the surface of the imaging device and the photo acceptance unit, so the zoom lenses discussed in Japanese Patent Laid-Open No. 2003-177314 and Japanese Patent Laid-Open No. 2004-4765 reduce vignetting from occurring.

Incidentally, in recent years, improvement of imaging devices has advanced, and an imaging device having a configuration where the surface thereof is disposed with an on-chip lens subjected to decentering, and an imaging device having a configuration wherein the above vignetting is hardly caused even if an incident angle is relatively great by providing an intra-layer lens within the imaging device, have been discussed. Thus, for a zoom type lens where the exit pupil is relatively short, a 3-group zoom lens made up of negative, positive, and negative refractive power lens groups in order from the object side to the image side has been discussed (U.S. Pat. Nos. 5,283,693, USP No. 5,357,374, and USP No. 5,268,792).

U.S. Pat. No. 5,283,693 discusses a zoom lens made up of 5 lenses in all, where the focal distance of the entire system is changed by changing the interval between the respective lens groups.

U.S. Pat. No. 5,357,374 discusses a zoom lens, which changes the focal distance by changing the interval between the respective lens groups, where a first lens group is made up of a single negative lens, a second lens group is made up of a positive lens of which the surface on an object side is a concave meniscus shape, and a third lens group is made up of a negative lens of which the surface on an object side is a concave meniscus shape.

U.S. Pat. No. 5,268,792 discusses a zoom lens made up of three through six lenses in all.

It is difficult for the respective embodiments of the zoom lens discussed in Japanese Patent Laid-Open No. 2003-177314 to handle a sensor of a mega-pixel or greater from the aspect of optical performance.

The lens performance in the respective embodiments in Japanese Patent Laid-Open No. 2004-4765 can handle mega-pixel sensors, but is designed under the condition of a collapsible camera, so that the total length is long as an optical system, and sufficient reduction in size cannot be always realized.

With the zoom lenses in Japanese Patent Laid-Open No. 2003-177314 and Japanese Patent Laid-Open No. 2004-4765, optical performance can be improved by further increasing the number of lenses to be configured.

However, upon the exit pupil being lengthened, the effective diameter of the lens system becomes closer to the sensor size overall, and consequently, the thickness of the lens system needs to be increased, resulting in the total lens length being long.

With U.S. Pat. No. 5,283,693, the number of lenses to be configured is small, and is a 3-group zoom lens made up of negative, positive, and negative refractive power lens groups, but this zoom lens is weak in the refractive power of the third lens group, so that contribution to reduction in size of the lens system due to the negative lens of the third lens group is not always sufficient.

Also, even with the zoom lens in U.S. Pat. No. 5,357,374, the refractive power of the third lens group is very weak, so the same problem as mentioned above occurs. Also, the respective lens groups have a single lens configuration, so sensitivity is very high.

The zoom lens in U.S. Pat. No. 5,268,792 is short in back focus for use as a viewfinder camera, so that it is difficult to obtain minimum required back focus in the event of applying this to an imaging device.

In general, when the number of lenses in the respective lens groups making up a zoom lens is great, the length on the optic axis of each lens group becomes long, and also when the amount of movement in zooming and focusing of the respective lens groups is great, the total lens length becomes long, so it becomes difficult to realize reduction in size of the entire lens system.

SUMMARY OF THE INVENTION

At least one exemplary embodiment is directed to a microminiature zoom lens having high optical performance, employed for a small imaging apparatus (e.g., digital still camera, cellular phone, PDA, other imaging apparatus as known by one of ordinary skill in the relevant arts).

At least one exemplary embodiment is directed to a zoom lens, which can have a relatively small number of lenses to be configured, a desired zoom ratio, high optical performance, and can be used in an imaging apparatus.

In addition, at least one exemplary embodiment is directed to a zoom lens, which can have a very short length in the total lens length, while handling an imaging device of mega-pixels or more, has high optical performance, and can be used in an imaging apparatus.

A zoom lens according to at least one exemplary embodiment comprises, in order from the object side to the image side, a first lens group of negative refractive power, a second lens group of positive refractive power, and a rear group including one or more lens groups, where the first lens group and the second lens group move at the time of zooming. Where the first lens group comprises, in order from the object side to the image side, an eleventh lens of negative refractive power, and a twelfth lens of positive refractive power, where, with the focal distance of the first lens group as f1, the focal distance of the second lens group as f2, the focal distance of the entire system at the wide-angle end as fw, and the focal distance of the entire system at the telephoto end as ft, the following conditions are satisfied $$1.5 \leq ft/fw \quad (1)$$

$$1.75 < |f1|/f2 < 2.5 \quad (2).$$

Further features of the present invention will become apparent from the following description of exemplary embodiments with reference to the attached drawings.

DESCRIPTION OF THE EMBODIMENTS

Figure 1:
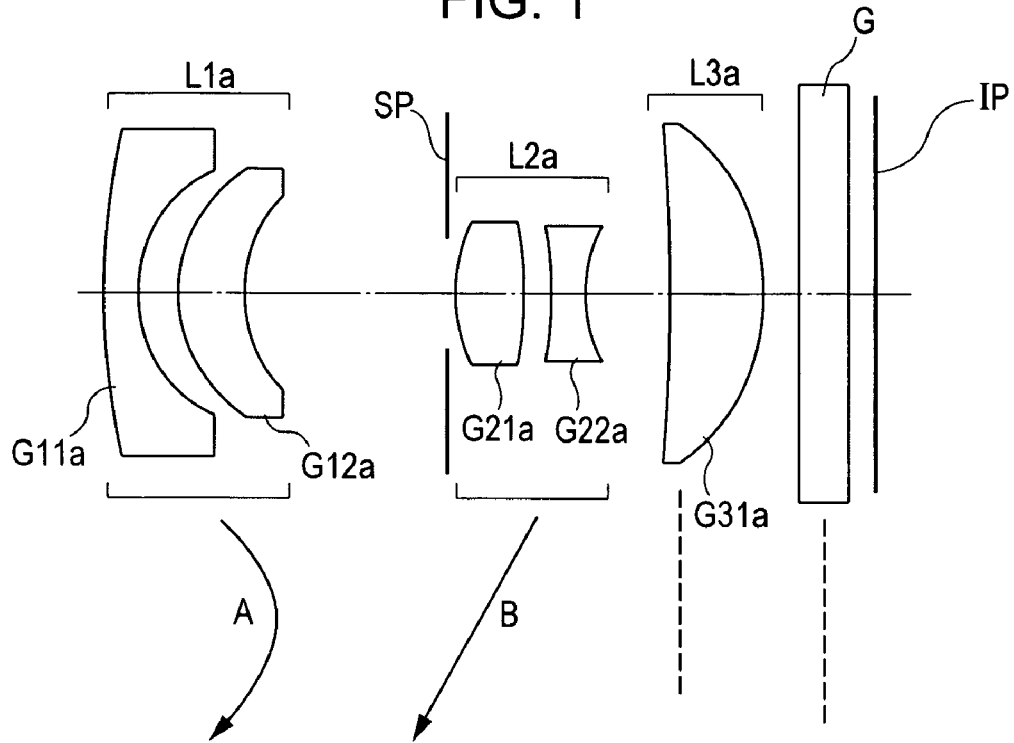
FIG. 1 illustrates a cross-sectional view of a lens according to a numerical example 1 of at least one exemplary embodiment.

The following description of exemplary embodiment(s) is merely illustrative in nature and is in no way intended to limit the invention, its application, or uses.

Exemplary embodiments can be operatively connected to various imaging devices (e.g., electronic cameras, camcorders, digital still cameras, film cameras, broadcast cameras, other imaging devices as known by one of ordinary skill, and equivalents) forming imaging systems.

Processes, techniques, apparatus, and materials as known by one of ordinary skill in the art may not be discussed in detail but are intended to be part of the enabling description where appropriate. For example lens and lens units are discussed and any material that can be used to form lenses should fall within the scope of exemplary embodiments (e.g., glass, Si). Additionally the actual size of the lens may not be discussed however any size from macro lenses to nano lenses are intended to lie within the scope of exemplary embodiments (e.g., lenses with diameters of nanometer size, micro size, centimeter size, and meter sizes).

Additionally exemplary embodiments are not limited to visual imaging devices (e.g., optical photographic systems), for example the system can be designed for use with infrared and other wavelength imaging systems. Additionally, exemplary embodiments can be used with non-digital systems as well as digital systems (e.g., photographic systems using CCDs).

Notice that similar reference numerals and letters refer to similar items in the following figures, and thus once an item is defined in one figure, it may not be discussed or further defined in the following figures.

Description will be made below regarding examples of a zoom lens according to exemplary embodiments, some of which can also be used in an imaging apparatus.

Figure 2:
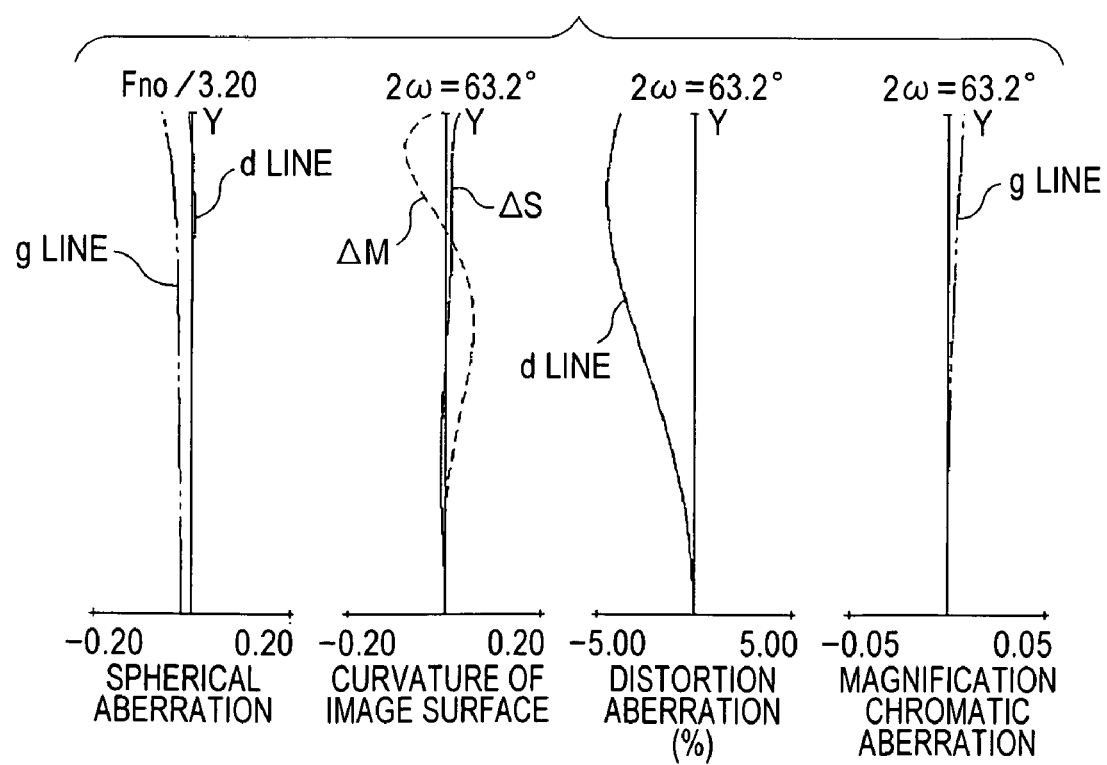
FIG. 2 illustrates aberrations at the wide-angle end according to the numerical example 1 of at least one exemplary embodiment.
Figure 3:
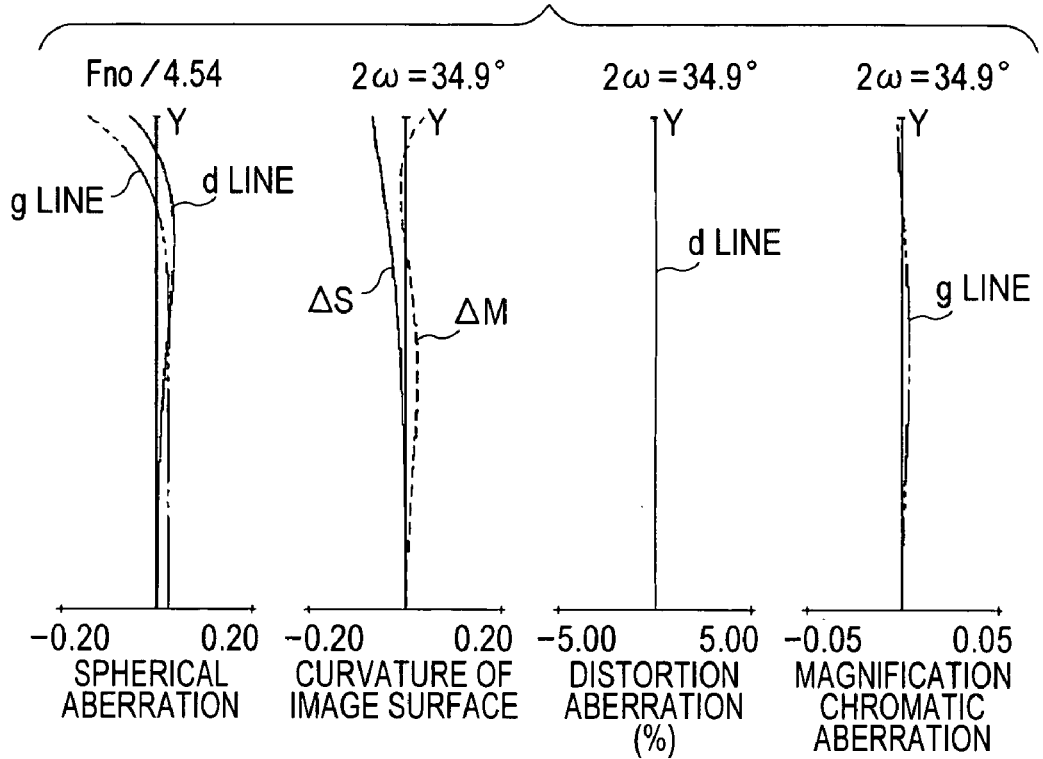
FIG. 3 illustrates aberrations at the telephoto end according to the numerical example 1 of at least one exemplary embodiment.

FIG. 1 illustrates a lens cross-sectional view at the wide-angle end of a zoom lens according to an example 1 of at least one exemplary embodiment, and FIGS. 2 and 3 illustrate aberration diagrams at the wide-angle end and the telephoto end of the zoom lens according to example 1 respectively. In example 1 the zoom lens can have a zoom ratio of 1.88, and an aperture ratio in the range of 3.2 through 4.54. Note that other exemplary embodiments can have different ranges for the aperture ratio and for the zoom ratio, thus the numbers stated in examples are illustrative only and non limitative.

Figure 4:
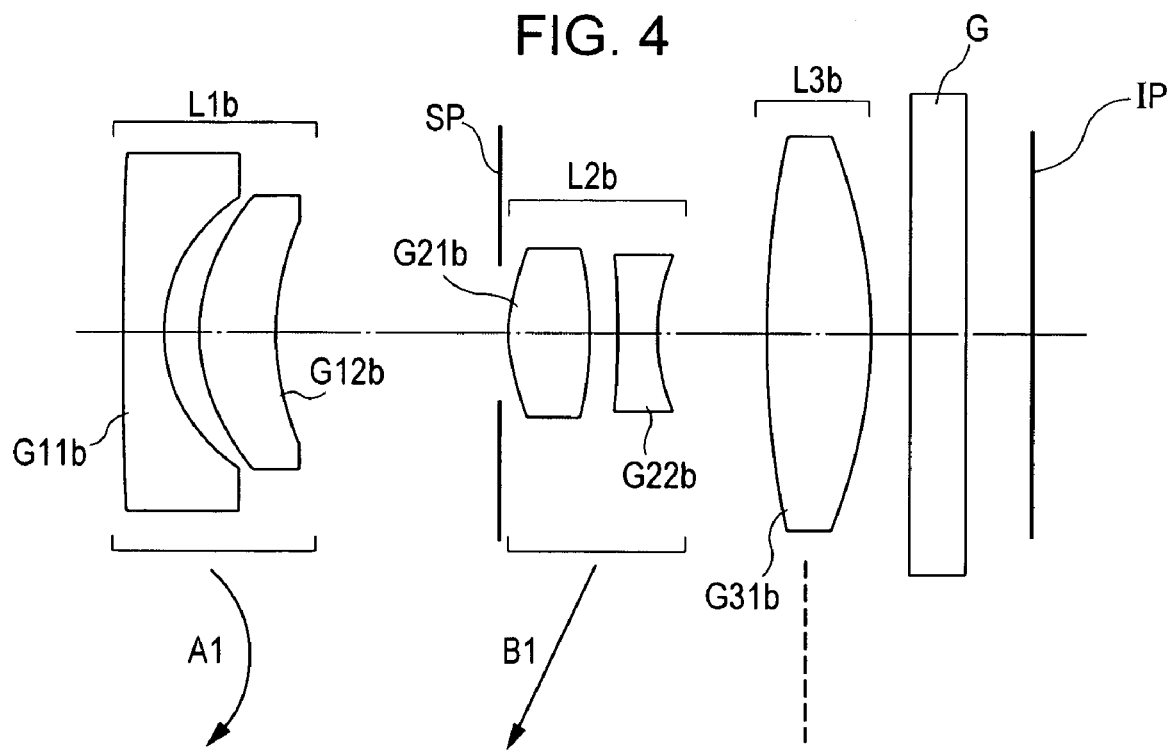
FIG. 4 illustrates a cross-sectional view of a lens according to a numerical example 2 of at least one exemplary embodiment.
Figure 5:
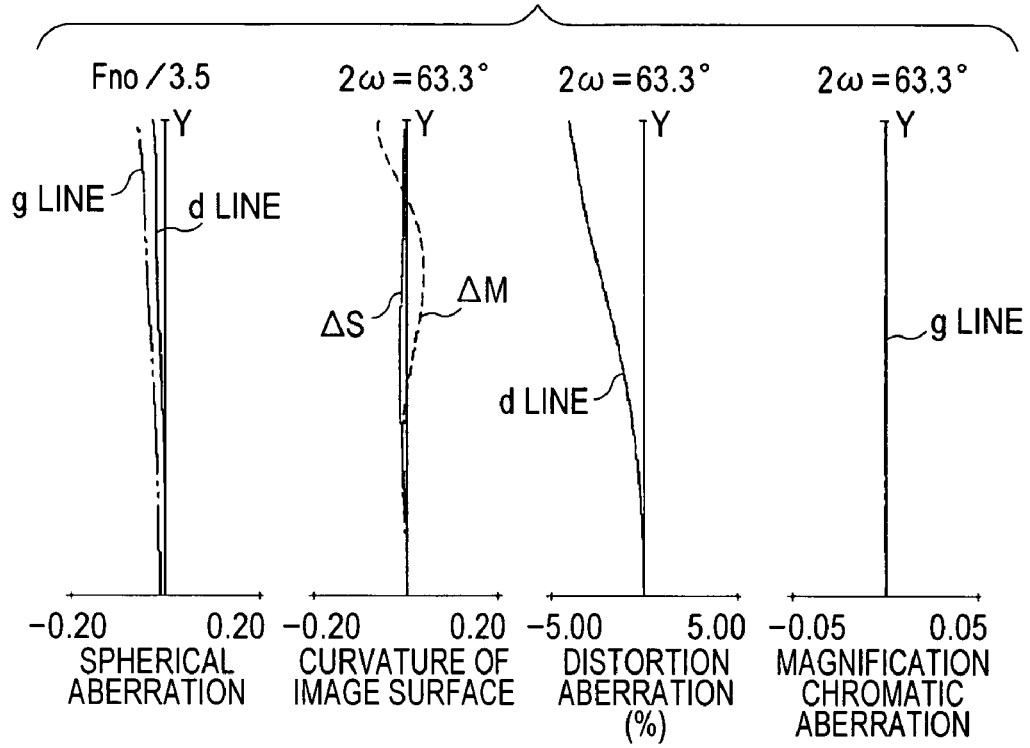
FIG. 5 illustrates aberrations at the wide-angle end according to the numerical example 2 of at least one exemplary embodiment.
Figure 6:
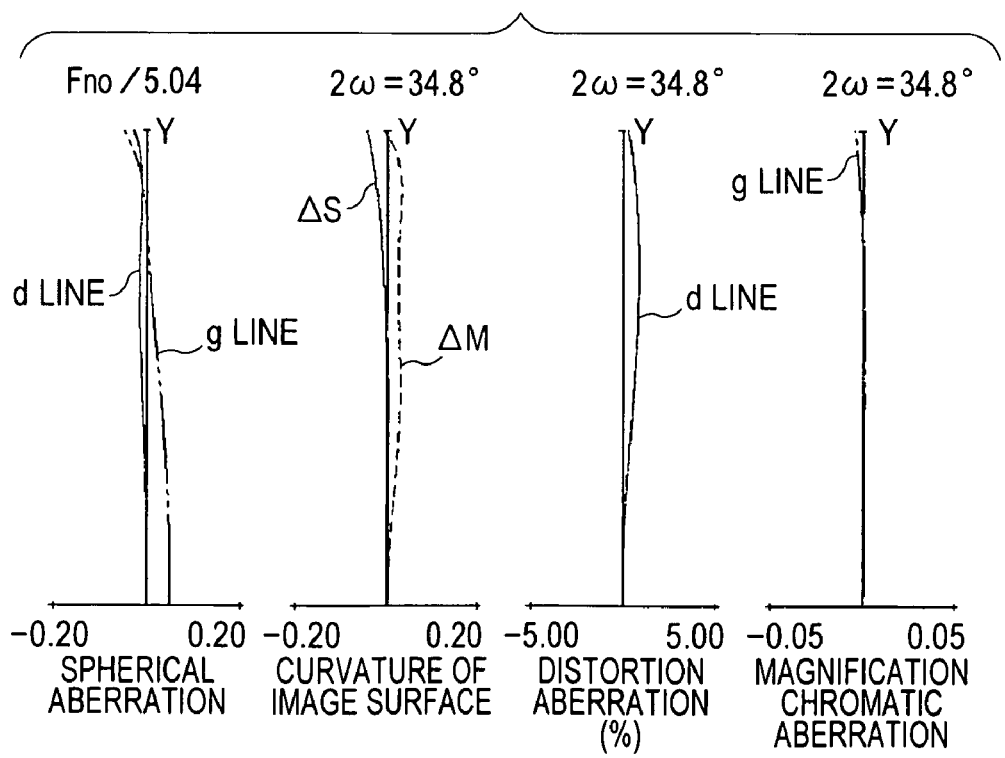
FIG. 6 illustrates aberrations at the telephoto end according to the numerical example 2 of at least one exemplary embodiment.

FIG. 4 illustrates a lens cross-sectional view at the wide-angle end of a zoom lens according to an example 2 of at least one exemplary embodiment, and FIGS. 5 and 6 illustrate aberration diagrams at the wide-angle end and the telephoto end of the zoom lens according to example 2 respectively. In example 2 is the zoom lens can have a zoom ratio of 1.88, and an aperture ratio in the range of 3.50 through 5.04.

Figure 7:
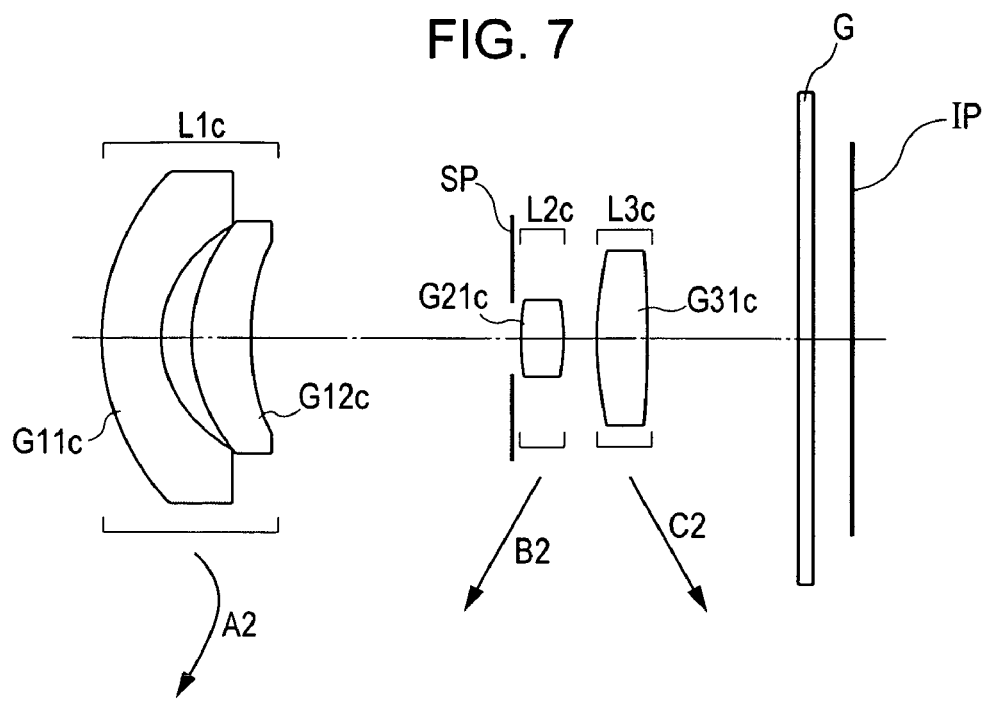
FIG. 7 illustrates a cross-sectional view of a lens according to a numerical example 3 of at least one exemplary embodiment.
Figure 8:
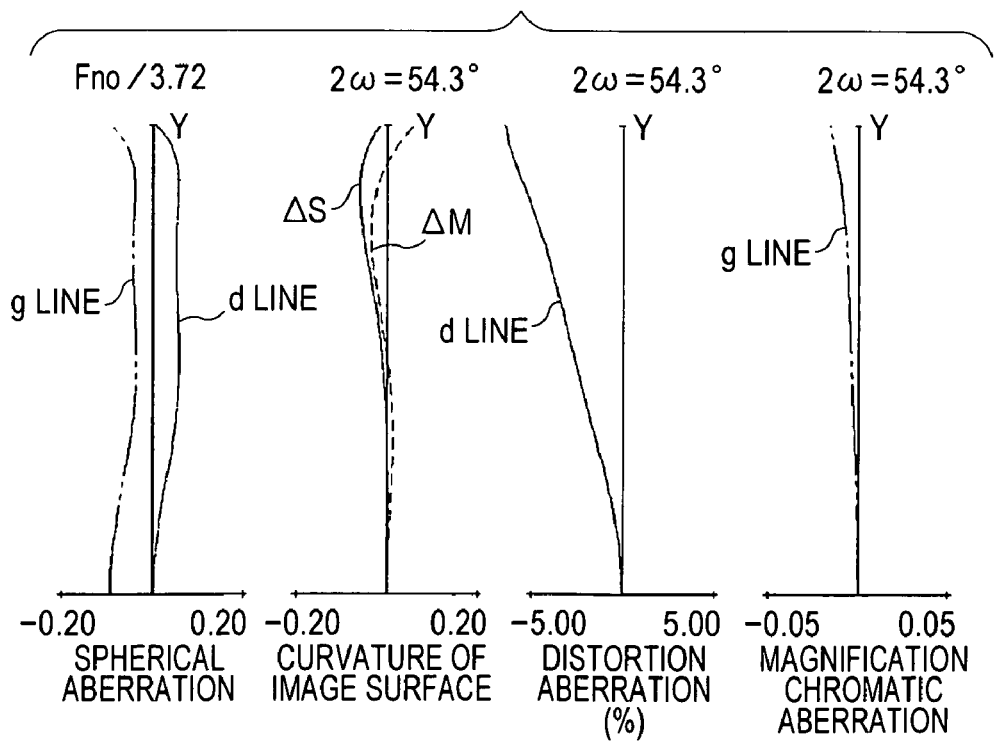
FIG. 8 illustrates aberrations at the wide-angle end according to the numerical example 3 of at least one exemplary embodiment.
Figure 9:
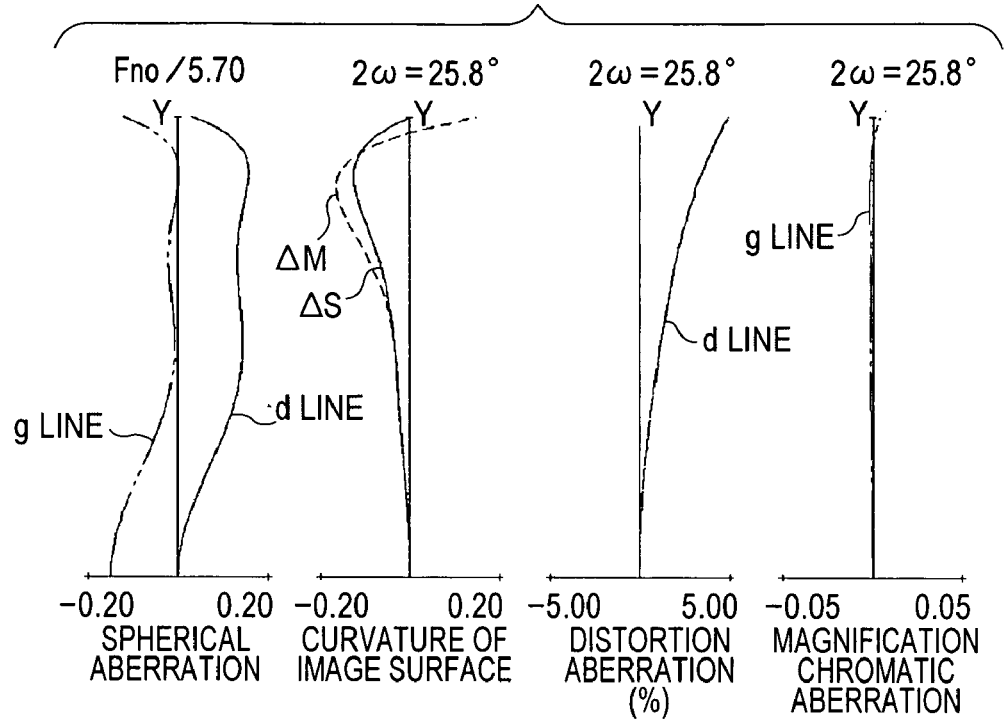
FIG. 9 illustrates aberrations at the telephoto end according to the numerical example 3 of at least one exemplary embodiment.

FIG. 7 illustrates a lens cross-sectional view at the wide-angle end of a zoom lens according to an example 3 of at least one exemplary embodiment, and FIGS. 8 and 9 illustrate aberration diagrams at the wide-angle end and the telephoto end of the zoom lens according to example 3 respectively. In example 3 the zoom lens can have a zoom ratio of 2, and an aperture ratio in the range of 3.72 through 5.70.

Figure 10:
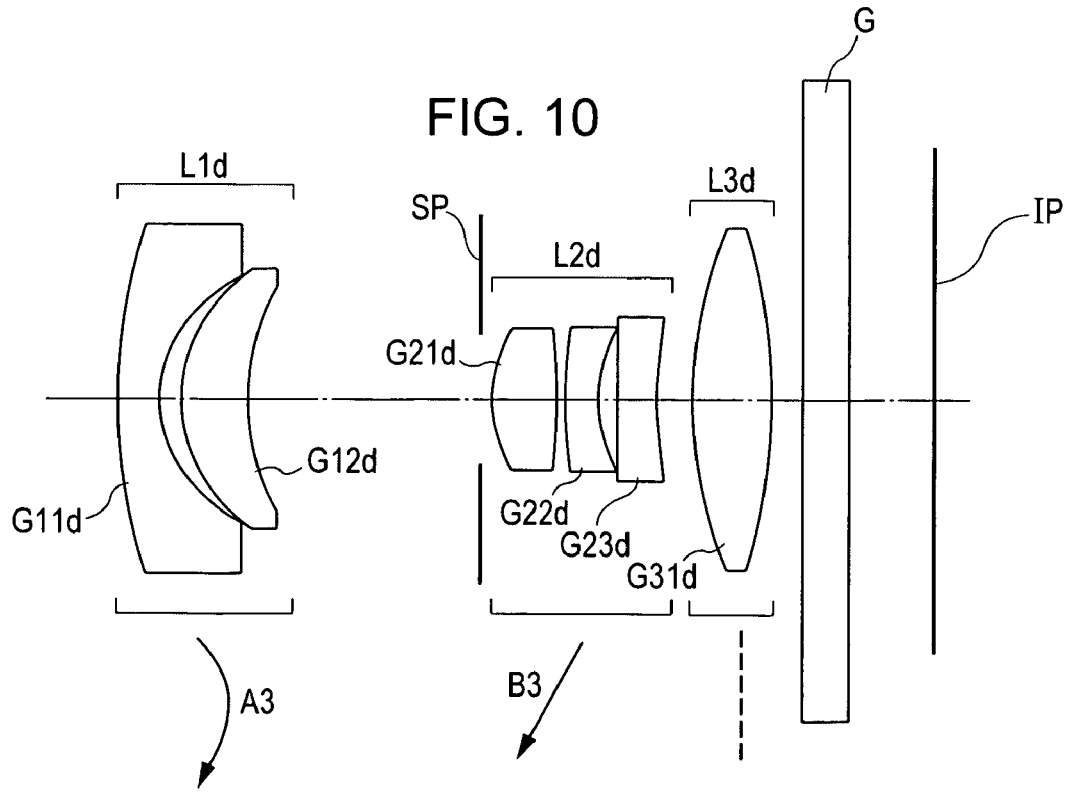
FIG. 10 illustrates a cross-sectional view of a lens according to a numerical example 4 of at least one exemplary embodiment.
Figure 11:
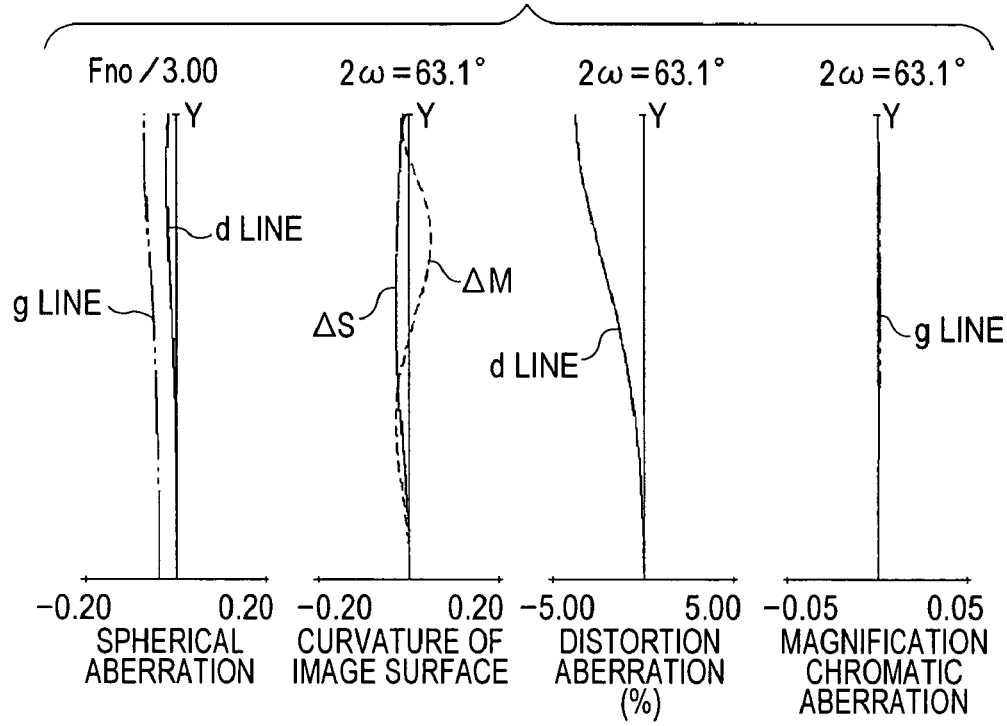
FIG. 11 illustrates aberrations at the wide-angle end according to the numerical example 4 of at least one exemplary embodiment.
Figure 12:
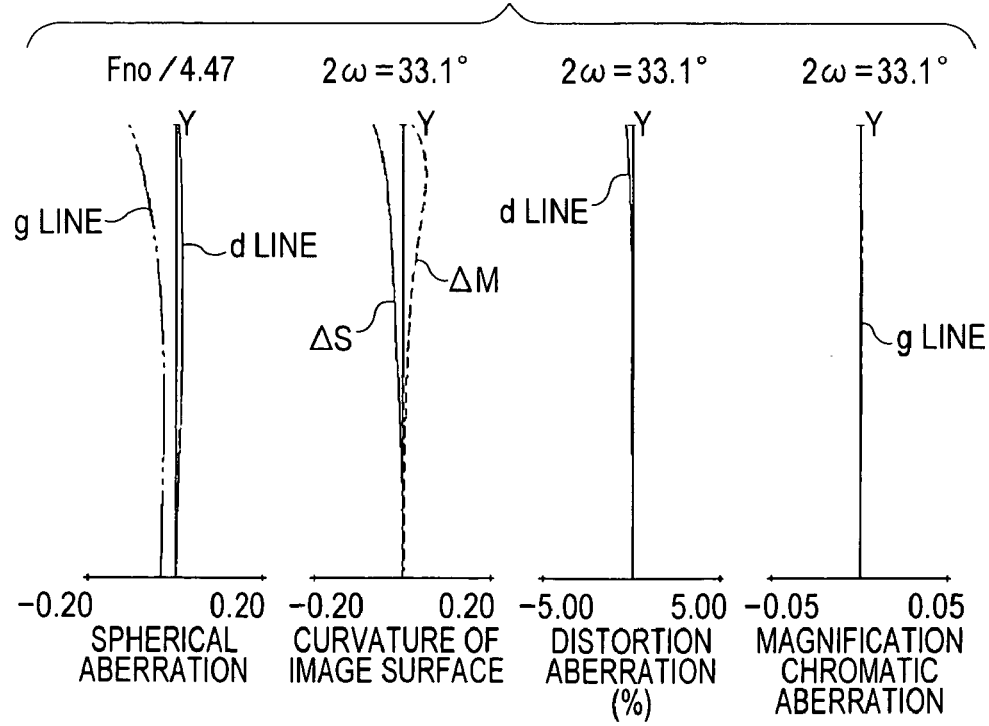
FIG. 12 illustrates aberrations at the telephoto end according to the numerical example 4 of at least one exemplary embodiment.

FIG. 10 illustrates a lens cross-sectional view at the wide-angle end of a zoom lens according to an example 4 of at least one exemplary embodiment, and FIGS. 11 and 12 illustrate aberration diagrams at the wide-angle end and the telephoto end of the zoom lens according to example 4 respectively. In example 4 the zoom lens can have a zoom ratio of 2, and an aperture ratio in the range of 3.00 through 4.47.

Figure 13:
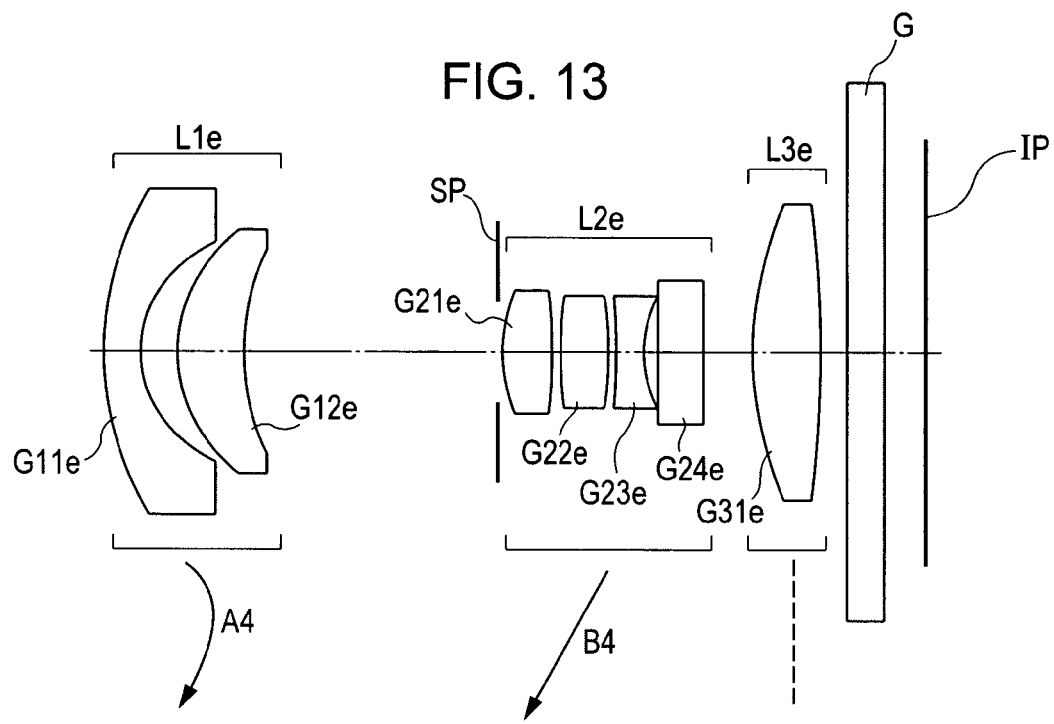
FIG. 13 illustrates a cross-sectional view of a lens according to a numerical example 5 of at least one exemplary embodiment.
Figure 14:
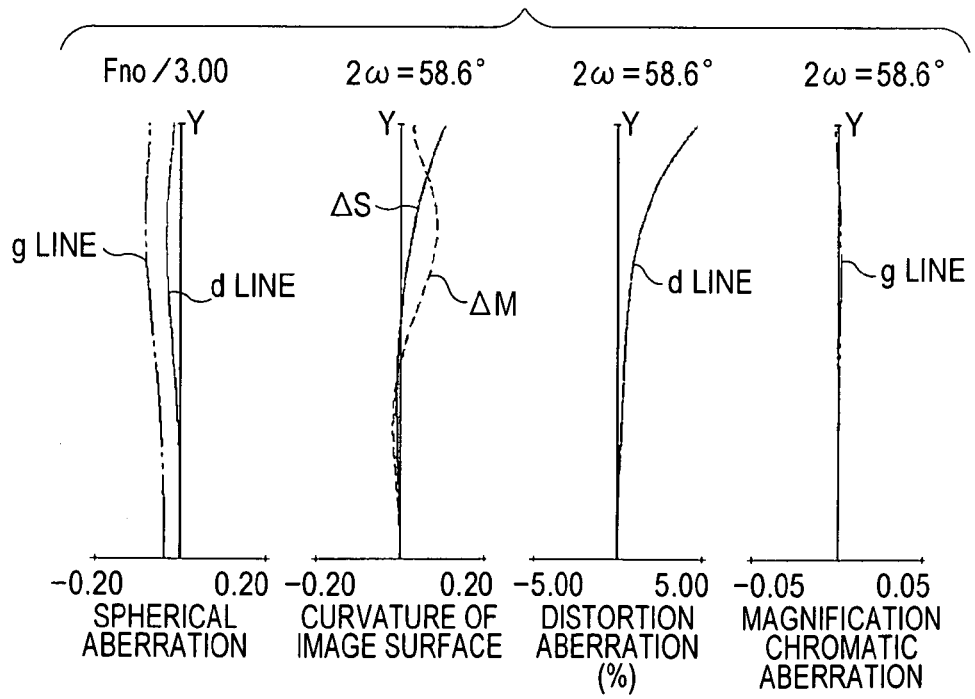
FIG. 14 illustrates aberrations at the wide-angle end according to the numerical example 5 of at least one exemplary embodiment.
Figure 15:
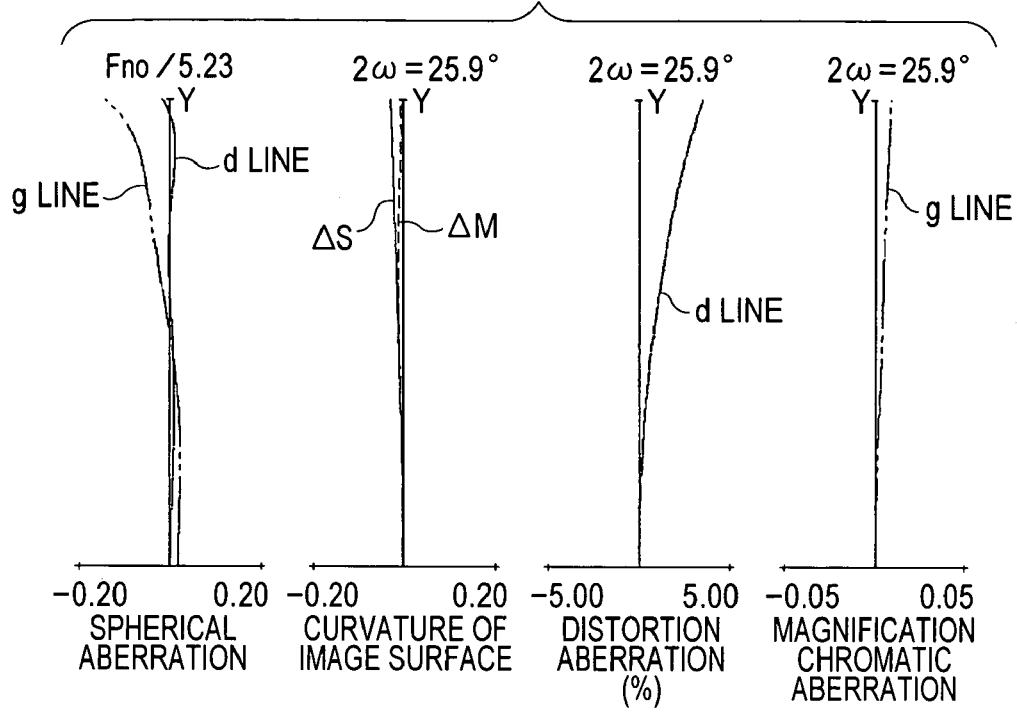
FIG. 15 illustrates aberrations at the telephoto end according to the numerical example 5 of at least one exemplary embodiment.

FIG. 13 illustrates a lens cross-sectional view at the wide-angle end of a zoom lens according to an example 5 of at least one exemplary embodiment, and FIGS. 14 and 15 illustrate aberration diagrams at the wide-angle end and the telephoto end of the zoom lens according to example 5 respectively. In example 5 the zoom lens can have a zoom ratio of 2.48, and an aperture ratio in the range of 3.00 through 5.23.

Figure 16:
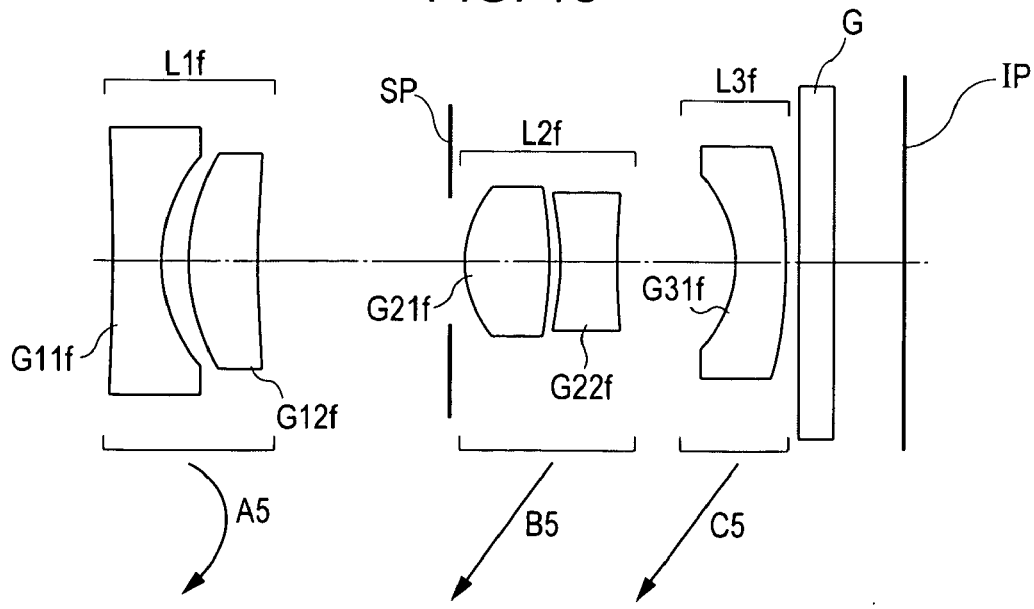
FIG. 16 illustrates a cross-sectional view of a lens according to a numerical example 6 of at least one exemplary embodiment.
Figure 17:
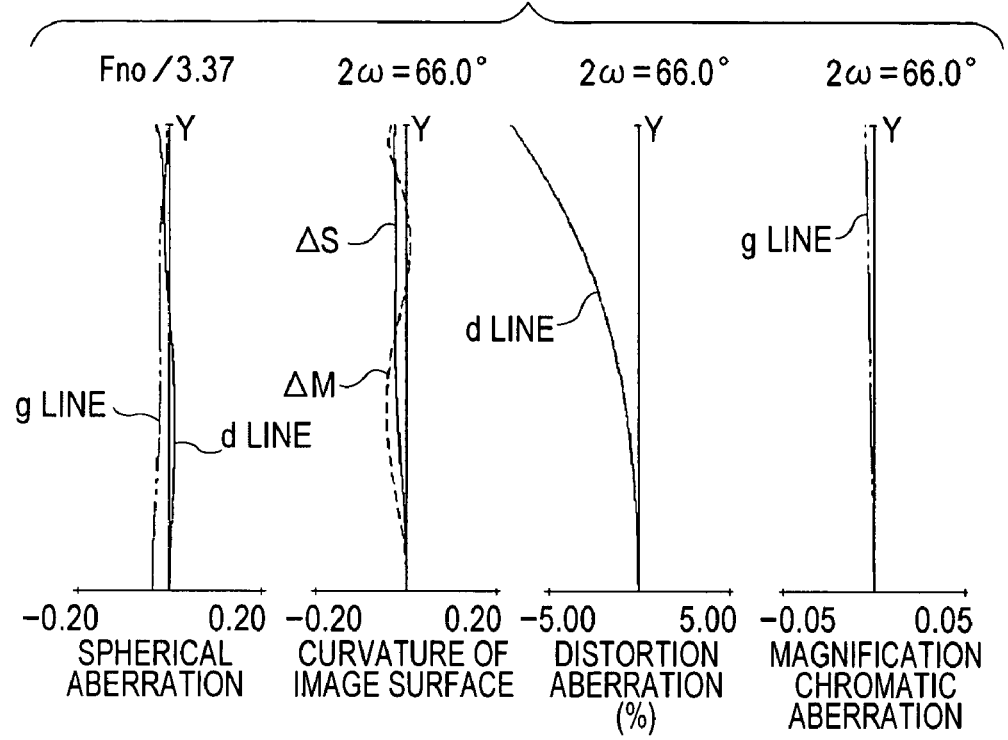
FIG. 17 illustrates aberrations at the wide-angle end according to the numerical example 6 of at least one exemplary embodiment.
Figure 18:
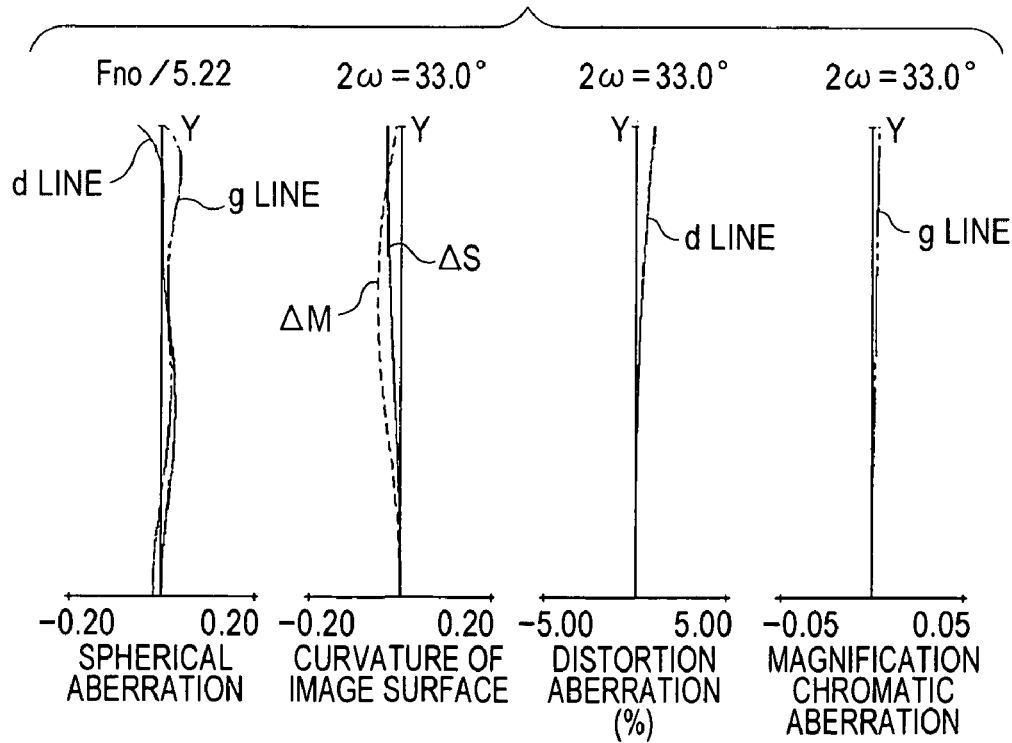
FIG. 18 illustrates aberrations at the telephoto end according to the numerical example 6 of at least one exemplary embodiment.

FIG. 16 illustrates a lens cross-sectional view at the wide-angle end of a zoom lens according to an example 6 of at least one exemplary embodiment, and FIGS. 17 and 18 illustrate aberration diagrams at the wide-angle end and the telephoto end of the zoom lens according to example 6 respectively. In example 6, the zoom lens can have a zoom ratio of 2, and an aperture ratio in the range of 3.37 through 5.22.

Figure 19:
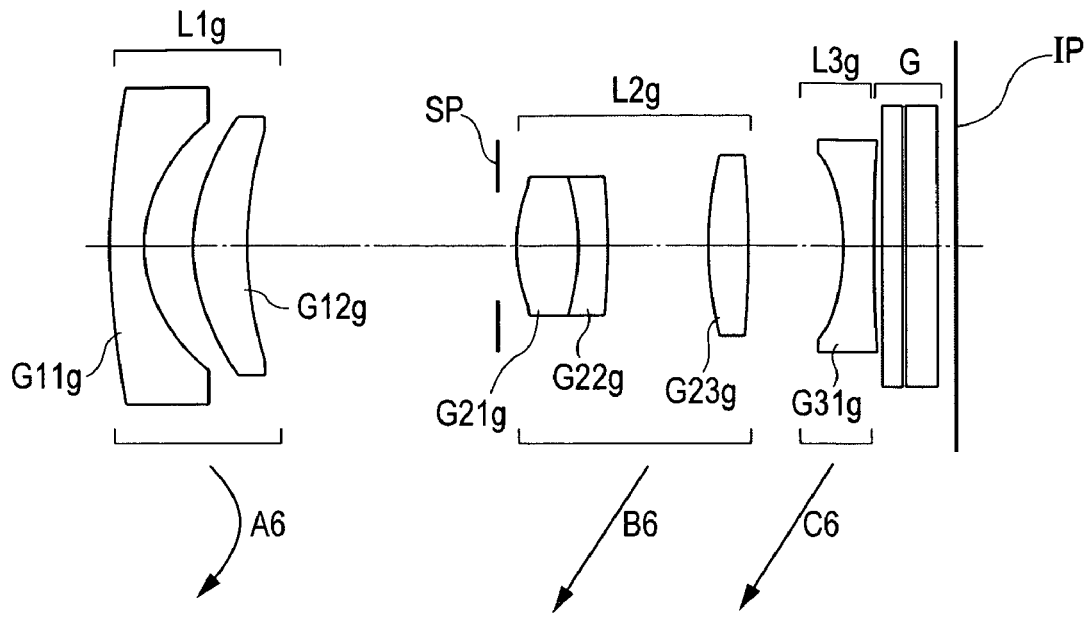
FIG. 19 illustrates a cross-sectional view of a lens according to a numerical example 7 of at least one exemplary embodiment.
Figure 20:
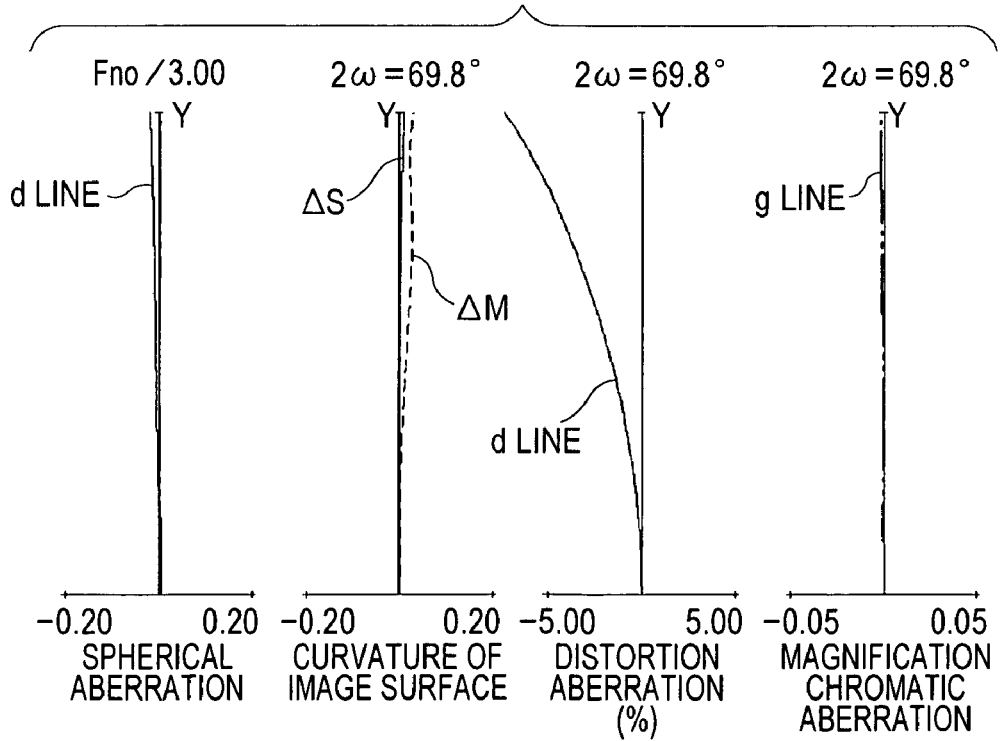
FIG. 20 illustrates aberrations at the wide-angle end according to the numerical example 7 of at least one exemplary embodiment.
Figure 21:
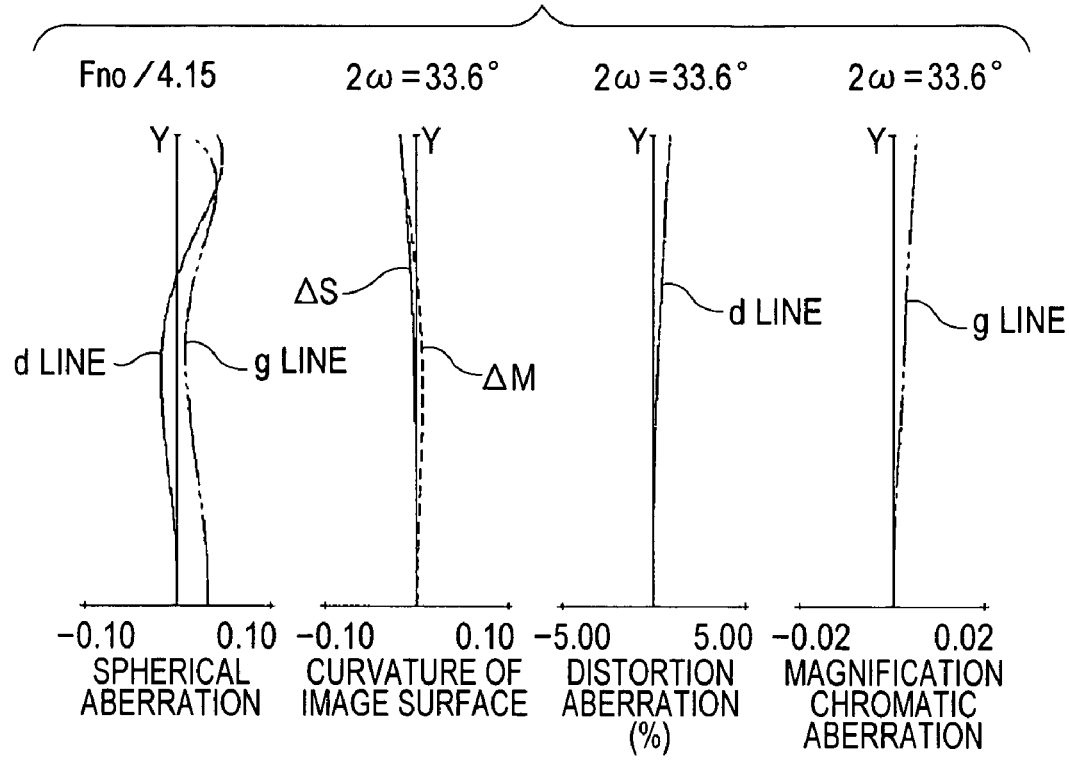
FIG. 21 illustrates aberrations at the telephoto end according to the numerical example 7 of at least one exemplary embodiment.

FIG. 19 illustrates a lens cross-sectional view at the wide-angle end of a zoom lens according to an example 7 of at least one exemplary embodiment, and FIGS. 20 and 21 illustrate aberration diagrams at the wide-angle end and the telephoto end of the zoom lens according to example 7 respectively. In example 7, the zoom lens can have a zoom ratio of 2, and an aperture ratio in the range of 3.00 through 4.61.

Figure 22:
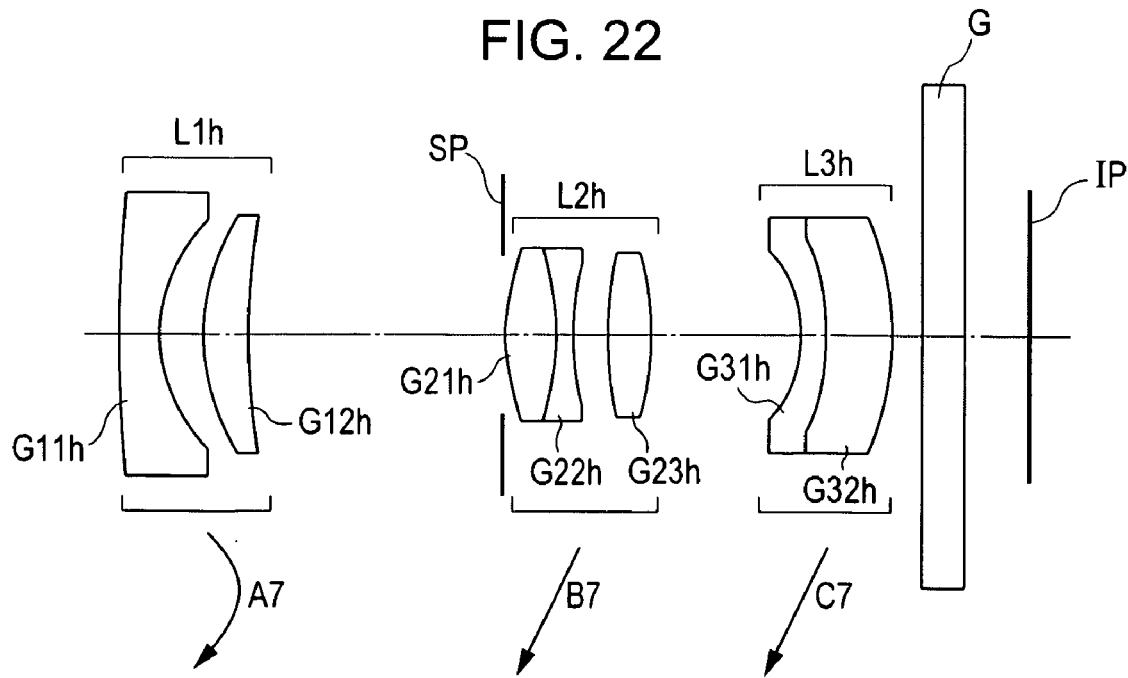
FIG. 22 illustrates a cross-sectional view of a lens according to a numerical example 8 of at least one exemplary embodiment.
Figure 23:
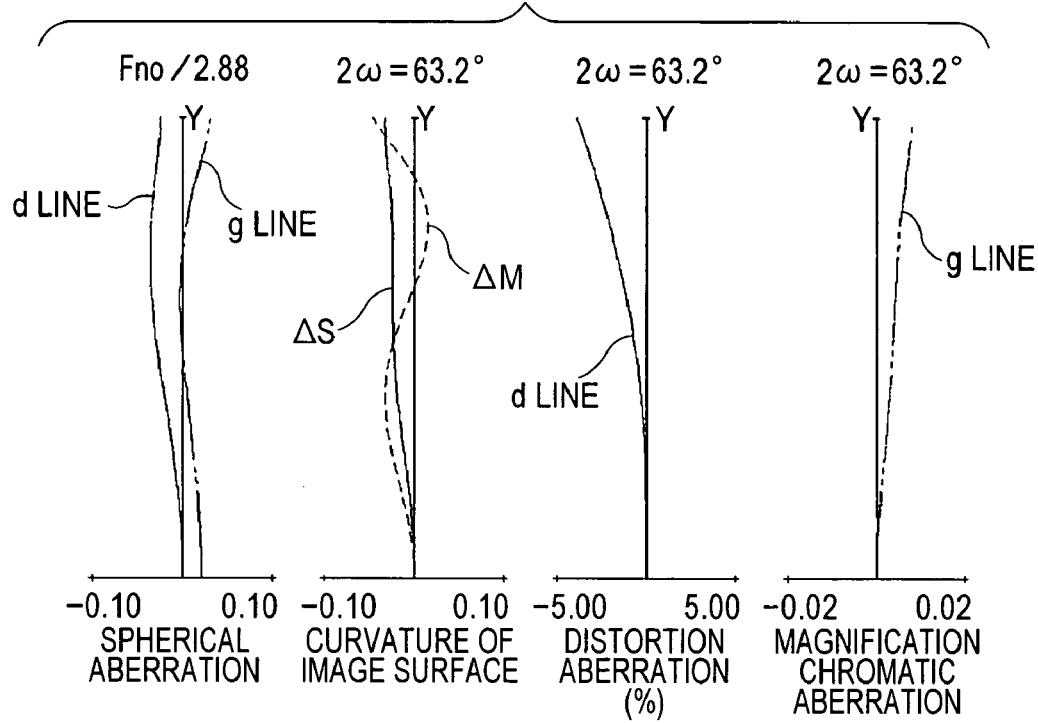
FIG. 23 illustrates aberrations at the wide-angle end according to the numerical example 8 of at least one exemplary embodiment.
Figure 24:
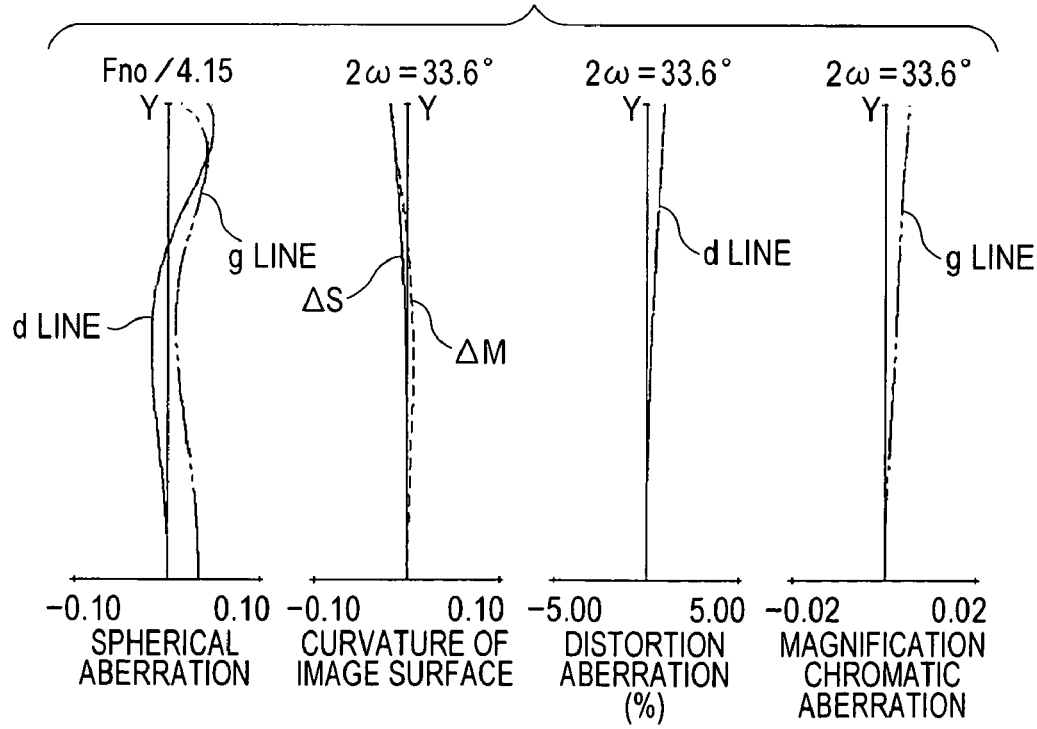
FIG. 24 illustrates aberrations at the telephoto end according to the numerical example 8 of at least one exemplary embodiment.

FIG. 22 illustrates a lens cross-sectional view at the wide-angle end of a zoom lens according to an example 8 of at least one exemplary embodiment, and FIGS. 23 and 24 illustrate aberration diagrams at the wide-angle end and the telephoto end of the zoom lens according to example 8 respectively. In example 8, the zoom lens can have a zoom ratio of 1.94, and an aperture ratio in the range of 2.88 through 4.15 or so.

Figure 25:
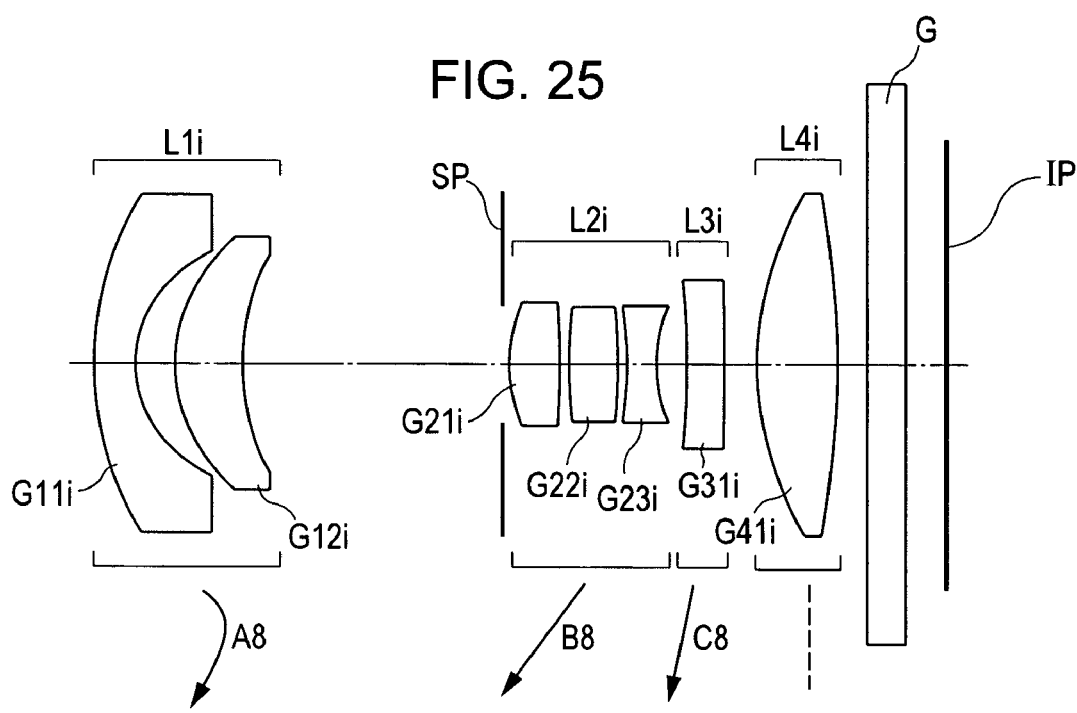
FIG. 25 illustrates a cross-sectional view of a lens according to a numerical example 9 of at least one exemplary embodiment.
Figure 26:
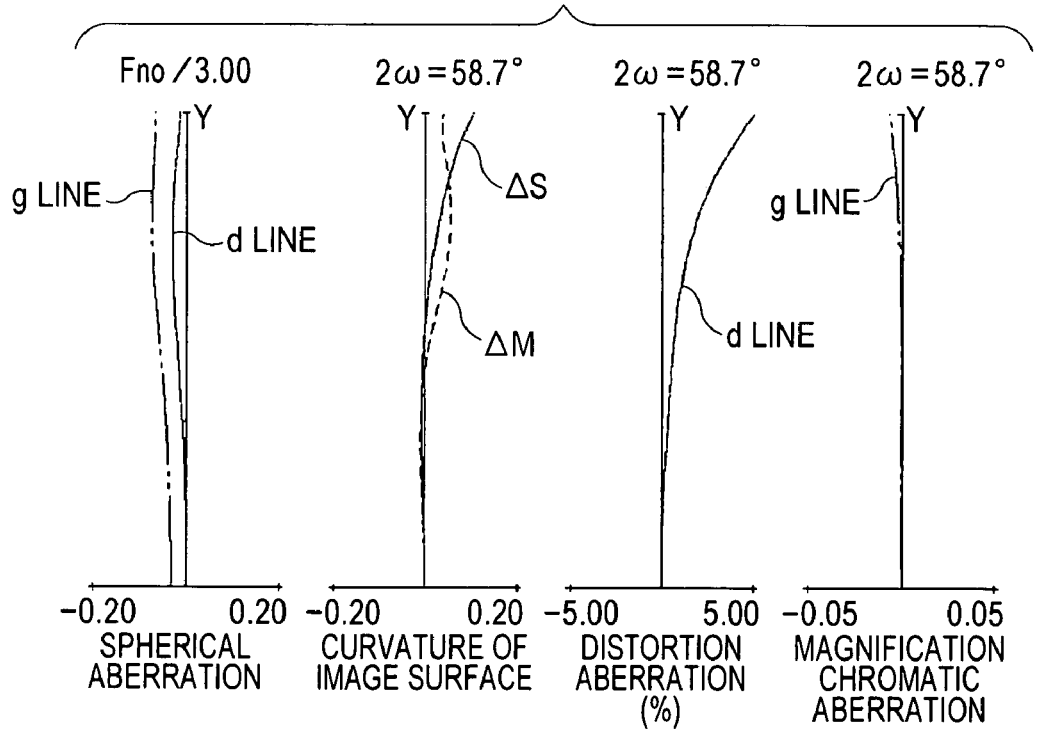
FIG. 26 illustrates aberrations at the wide-angle end according to the numerical example 9 of at least one exemplary embodiment.
Figure 27:
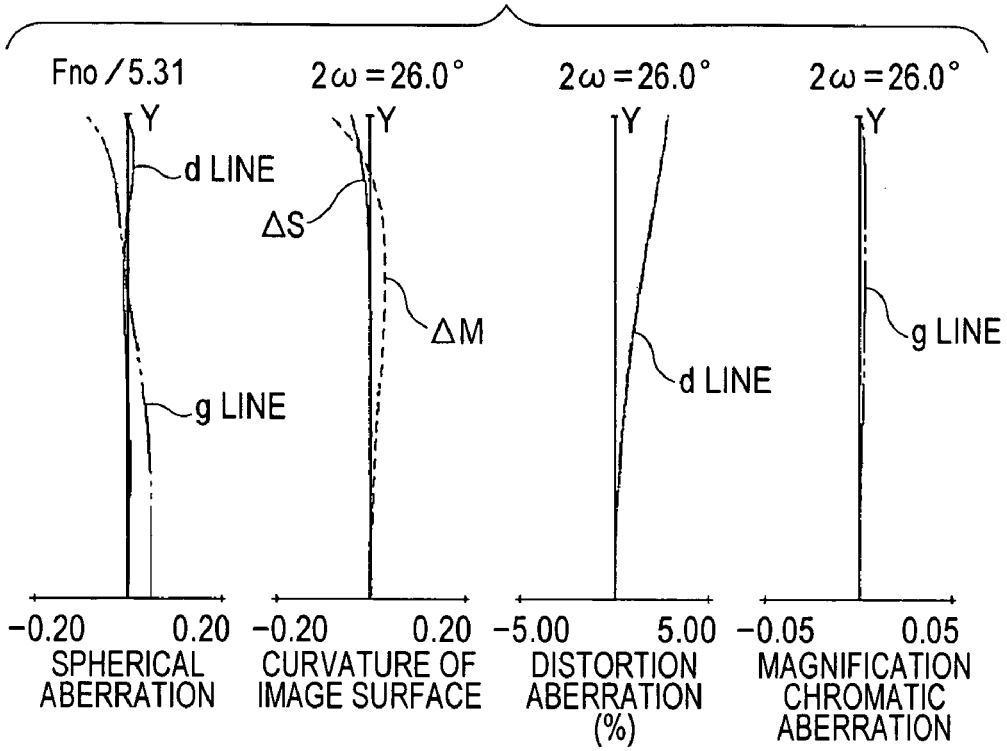
FIG. 27 illustrates aberrations at the telephoto end according to the numerical example 9 of at least one exemplary embodiment.

FIG. 25 illustrates a lens cross-sectional view at the wide-angle end of a zoom lens according to an example 9 of at least one exemplary embodiment, and FIGS. 26 and 27 illustrate aberration diagrams at the wide-angle end and the telephoto end of the zoom lens according to example 9 respectively. In example 9, the zoom lens can have a zoom ratio of 2.49, and an aperture ratio in the range of 3.00 through 5.31.

Figure 28:
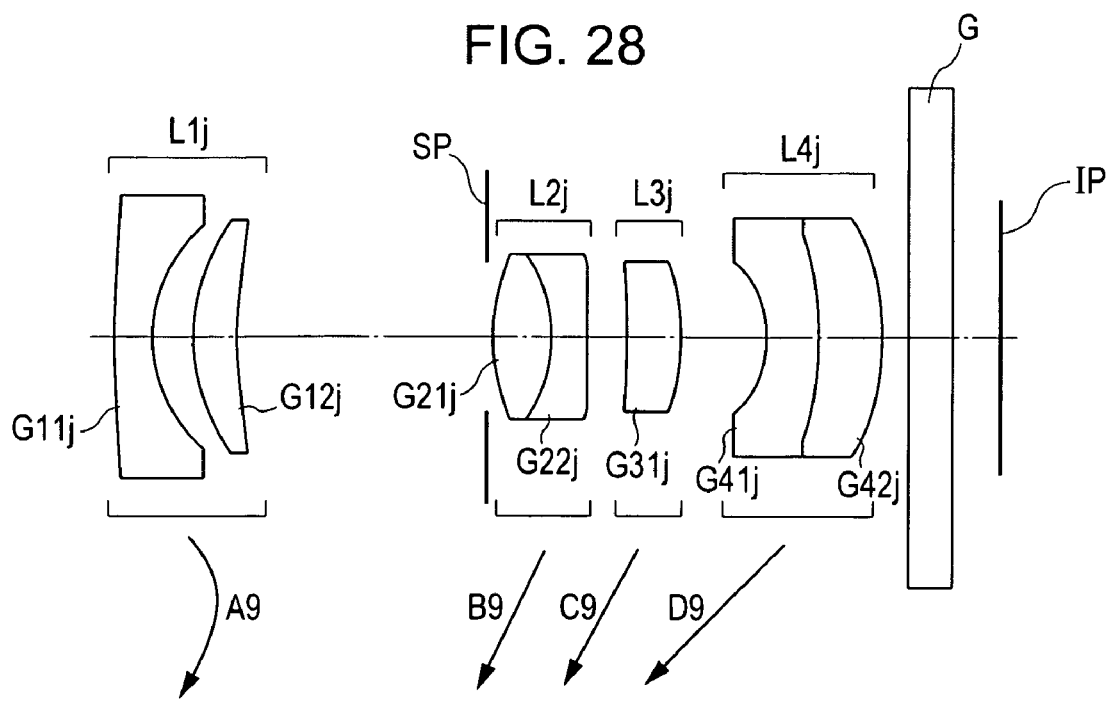
FIG. 28 illustrates a cross-sectional view of a lens according to a numerical example 10 of at least one exemplary embodiment.
Figure 29:
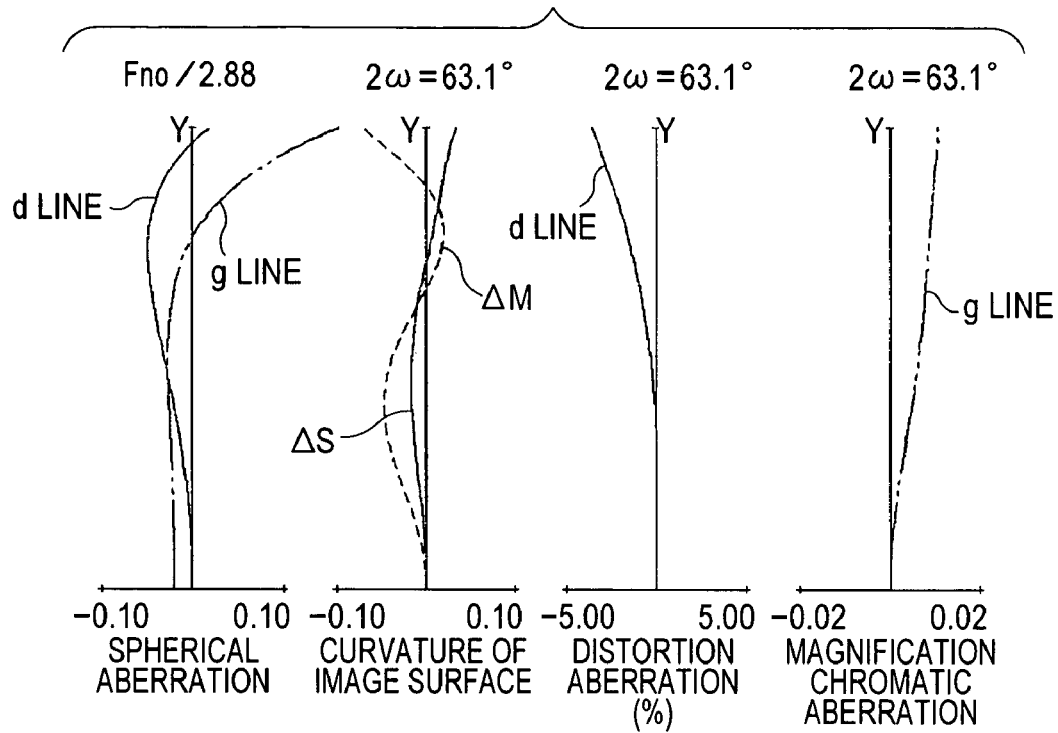
FIG. 29 illustrates aberrations at the wide-angle end according to the numerical example 10 of at least one exemplary embodiment.
Figure 30:
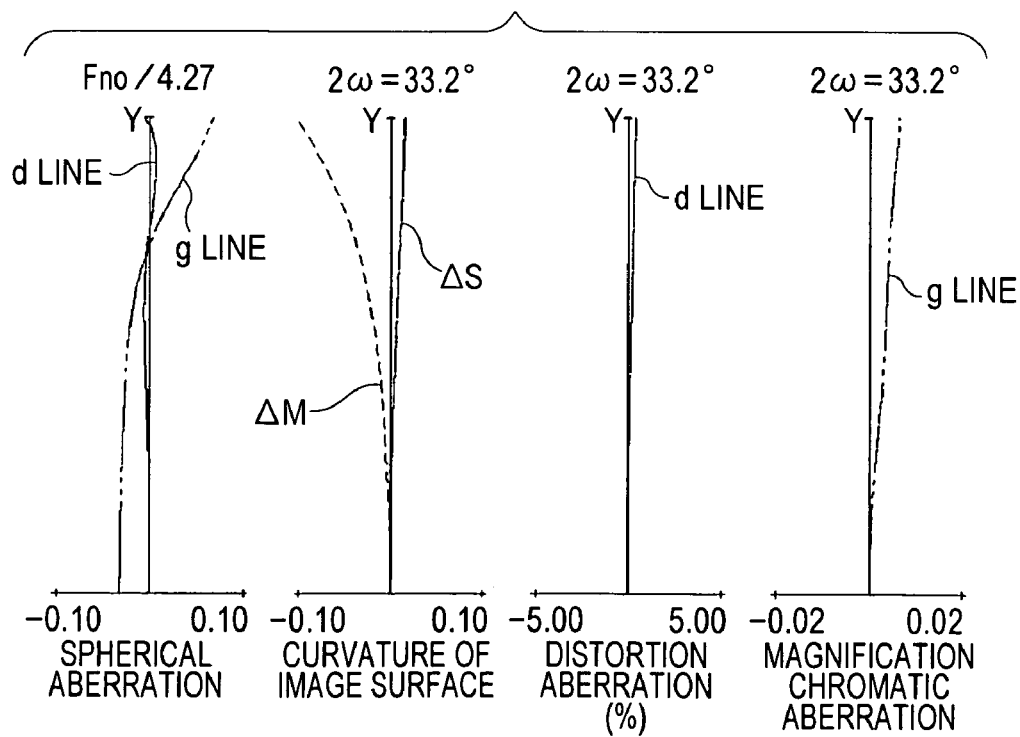
FIG. 30 illustrates aberrations at the telephoto end according to the numerical example 10 of at least one exemplary embodiment.

FIG. 28 illustrates a lens cross-sectional view at the wide-angle end of a zoom lens according to an example 10 of at least one exemplary embodiment, and FIGS. 29 and 30 illustrate aberration diagrams at the wide-angle end and the telephoto end of the zoom lens according to example 10 respectively. In example 10, the zoom lens can have a zoom ratio of 1.97, and an aperture ratio in the range of 2.88 through 4.27.

Figure 31:
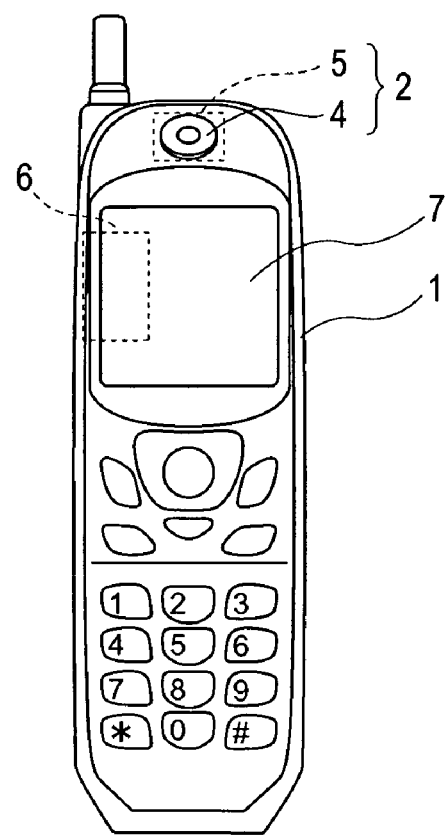
FIG. 31 illustrates a principal schematic diagram of optical equipment according to at least one exemplary embodiment.
Figure 32:
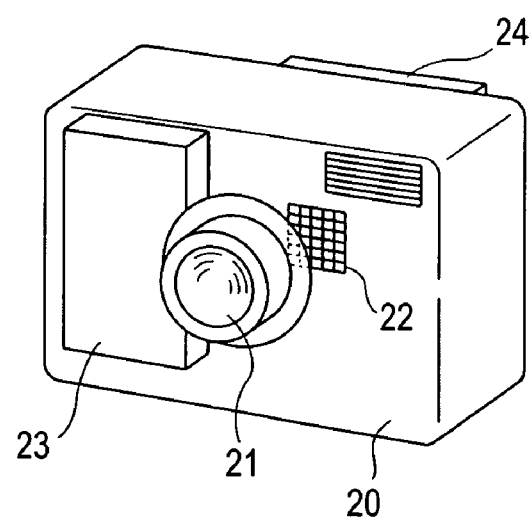
FIG. 32 illustrates a principal schematic diagram of an imaging apparatus according to at least one exemplary embodiment.

FIG. 31 illustrates a schematic diagram of portable equipment having the zoom lens according to at least one exemplary embodiment, and FIG. 32 illustrates a schematic diagram of an imaging apparatus having the zoom lens according to at least one other exemplary embodiment.

The zoom lens according to each example is also referred to as a photographing optical system, which can be used in an imaging apparatus (e.g., optical equipment). In the cross-sectional views the left hand side is the object side, and the right hand side is the image side.

In the lens cross-sectional views (e.g., FIG. 1), L1$a$–L1$j$ represents first lens groups of negative refractive power (optical power=the reciprocal number of the focal distance), L2$a$–L2$j$ represent second lens groups of positive refractive power, L3$a$–L3$j$ represent third lens groups of positive or negative refractive power, and L4$f$–L4$j$ represent fourth lens groups of positive or negative refractive power. Here, SP represents an aperture diaphragm, G represents an optical block (e.g., an optical filter, faceplate, crystal low-pass filter, infrared cut filter, other optical filters as known by one of ordinary skill in the relevant art, and equivalents), and IP represents an image surface (e.g., a photosurface equivalent to the imaging surface of a solid state imaging device (photoelectric transfer device) such as a CCD sensor, CMOS sensor), where the imaging surface can be disposed at the time of employing the photographing optical system (e.g., of a video camera or digital still camera).

In the aberration diagrams, d and g represent a d line and a g line respectively, ΔM and ΔS represent a meridional image surface and a sagittal image surface respectively, and magnification chromatic aberration is represented with the g line.

Note that with the following examples, the wide-angle end and the telephoto end mean zoom positions when a variable-powered lens group (e.g., second lens group L2a–L2j) positions on both ends in a movable range on the optical axis (e.g., via use of a mechanism).

Each example comprises a first lens group of negative refractive power, a second lens group of positive refractive power, and a rear group including one or more lens groups in order from the object side to the image side, and moves the first and second lens groups at the time of zooming.

In particular, when zooming from the wide-angle end to the telephoto end, the first lens group (e.g., L1a–L1j) moves (e.g., A, A1–A9) to the image side so as to draw a concave locus, and the second lens group (e.g., L2a–L2j) moves (e.g., B, B1–B9) to the object side.

Note that the rear group comprises a third lens group of positive or negative refractive power, or comprises a third lens group of negative refractive power and a fourth lens group of positive refractive power, or comprises a third lens group of positive refractive power and the fourth lens group of negative refractive power. Note that other combinations of positive and negative power are within the scope of exemplary embodiments and the discussion herein with respect to particular examples should not be interpreted to be limitative of all exemplary embodiments.

The basic configuration of the first lens group (e.g., L1a–L1j) comprises the first lens of negative refractive power and the second lens of positive refractive power in order from the object side to the image side.

Thus, employing multiple lens groups (e.g., three or more lens groups) yields suitable optical performance that can handle a sensor of mega-pixels or more.

Also, in one exemplary embodiment the first lens group (e.g., L1a–L1j) comprises two lenses of negative and positive refractive power, thereby relatively reducing an aberration occurring at decentering within the lens group, realizing reduction of sensitivity within the lens group, and further realizing reduction in size of the entire system with a smaller number of lenses (e.g., 7 or less in all).

In at least one exemplary embodiment, if we say that the focal distance of the telephoto end is ft, the focal distance of the wide-angle end is fw, the focal distance of the first lens group (e.g., L1a–L1j) is f1, and the focal distance of the second lens group (e.g., L2a–L2j) is f2, $$1.5 \leq ft/fw \quad (1)$$

$$1.75 < |f1|/f2 < 2.5 \quad (2)$$

can be satisfied.

Next, the technical content of each optional conditional expression will be described.

The conditional expression (1) and the conditional expression (2) stipulate the power (refractive power) of the entire lens system, and the power distribution of each lens group, and the distance between the first and second lens groups is reduced to achieve reduction in size of the entire lens system by strengthening the power of the second lens group (e.g., L2a–L2j).

Even if the conditional expression (1) is satisfied, when exceeding the lower limit of the conditional expression (2), the interval between the first lens group (e.g., L1a–L1j) and the second lens group (e.g., L2a–L2j) can be expanded to yield a predetermine variable-powered ratio, which can result in an increase in the total lens length at the wide-angle end. Conversely, when exceeding the upper limit, the telephoto ratio on the telephoto end side increases, which can result in an increase in the total lens length at the telephoto end.

The numerical ranges of the conditional expressions (1) and (2) can vary depending upon design criteria, for example for one exemplary embodiment the values can be set as follows:

$$1.7 \leq ft/fw \quad (1a)$$

$$1.80 < |f1|/f2 < 2.35 \quad (2a)$$

Thus, reduction in size of the entire lens system and high optical performance can be facilitated.

As described above, each example can yield a zoom lens having a simple configuration where the entire lens system can be reduced in size, the number of lenses to be configured can be reduced while maintaining high optical performance, (e.g., in the exemplary embodiments satisfying the conditional expressions (1) and (2)).

The first lens group (e.g., L1a–L1j) comprises, in order from the object side to the image side, an eleventh lens (e.g., G11a–G11j) of negative refractive power of which the surface on the object side is a convex meniscus shape, and a twelfth lens (e.g., G12a–G12j) of positive refractive power of which the surface on the object side is a convex meniscus shape, and with the curvature radii on the object side and on the image side of the eleventh lens (e.g., G11a–G11j) as R11 and R12 respectively, and the curvature radii on the object side and on the image side of the twelfth lens (e.g., G12a–G12j) as R13 and R14 respectively, the following conditions can be satisfied for at least one exemplary embodiment:

$$1.5 < |R11/R12| \quad (3)$$

$$|R13/R14| < 1.2 \quad (4)$$

The conditional expressions (3) and (4) are expressions that can be used for stipulating the radius of curvature of each lens surface of the two lenses employed for the first lens group (e.g., L1a–L1j). In some cases, when deviating from the conditional expressions (3) and (4), the power of the first lens group (e.g., L1a–L1j) can become weak, so that it can become difficult to realize reduction in size of the entire lens system.

The numerical ranges of the conditional expressions (3) and (4) are recommended can be set as follows:

$$1.8 < |R11/R12| \quad (3a)$$

$$|R13/R14| < 1.0 \quad (4a)$$

If we say that the Abbe numbers of the materials of the eleventh lens (e.g., G11a–G11j) and the twelfth lens (e.g., G12a–G12j) are v11 and v12 respectively, $$1.0 < v11/v12 \quad (5)$$

can be satisfied.

The conditional expression (5) is an expression that can be used for stipulating the Abbe numbers of the materials of the two lenses employed for the first lens group (e.g., L1a–L1j). When deviating from the conditional expression (5), it can become difficult to perform appropriate correction of an on-axis chromatic aberration.

The numeric value of the conditional expression (5) can vary but in at least one exemplary embodiment the values can be set as follows:

$$1.1 < v11/v12 \quad (5a)$$

The zoom lenses in the examples can be of a type where the lens-barrel retaining the zoom lens does not collapse, when being employed as a photographing lens mounted on a portable terminal (e.g., a cellular phone, PDA). For example in one exemplary embodiment that can facilitate a reduction in size, a back focus can be set to 2.3 mm or less, and the distance to the sensor surface (image surface) from the lens surface on the most object side of the first lens group (e.g., L1a–L1j) can be set to 15 mm or less.

Focusing from an infinite (or distant) distance object to a short distance object can be performed by moving the third lens group (e.g., L3a–L3j) backward. Note that focusing can be performed by moving the other lens group or the entire lens, alternatively or in conjunction.

When zooming from the wide-angle end to the telephoto end, in the event that the lens group closest to the image surface has positive refractive power, the first lens group (e.g., L1a–L1j) can move (e.g., (A), (A1–9)) to the image side so as to draw a convex locus, and the second lens group (e.g., L2a–L2j) can move (e.g., (B), (B1–9)) from the image side to the object side so as to expand the interval as to the lens group closest to the image surface.

Next, description will be made in order regarding the features of the zoom lenses according to the respective examples.

First, the examples 1 through 5 in FIGS. 1, 4, 7, 10, and 13 will be described.

The zoom lenses according to the examples 1 through 5 comprise, in order from the object side to the image side, three lens groups comprising the first lens group (e.g., L1a–L1e) of negative refractive power, the second lens group (e.g., L2a–L2e) of positive refractive power, and the third lens group (e.g., L3a–L3e) of positive refractive power, and when zooming from the wide-angle end to the telephoto end, the first lens group (e.g., L1a–L1e) moves (e.g., A, A1–A5) to the image side so as to draw a convex locus, the diaphragm SP and the second lens group (e.g., L2a–L2e) moves (e.g., B, B1–B5) to the object side integrally, and the third lens group (e.g., L3a–L3e) is fixed or moves (e.g., C2) to the image surface side.

The zoom lenses according to the examples 1 through 5 perform principal change in power by moving (e.g., B, B1–B5) the second lens group (e.g., L2a–L2e), where movement of a image point along with change in power is corrected by moving the first lens group (e.g., L1a–L1e) to the image side so as to draw a convex locus (e.g., A, A1–A5). Also, the outer diameters of the lenses making up the first lens group (e.g., L1a–L1e) can be prevented from increase by disposing the diaphragm SP on the most object side of the second lens group (e.g., L2a–L2e) to reduce the distance between the incident pupil on the wide-angle side and the first lens group (e.g., L1a–L1e). Appropriate optical performance is obtained without increasing the number of lenses to be configured by reducing the off-axis aberrations with the first lens group (e.g., L1a–L1e) and the third lens group (e.g., L3a–L3e)which sandwich the diaphragm SP disposed on the object side of the second lens group (e.g., L2a–L2e).

With the zoom lenses according to the examples 1 through 5, the first lens group (e.g., L1a–L1e) comprises at least one negative lens and one positive lens. The number of lenses to be configured can vary but the non limiting examples discussed herein have seven or less lenses in the entire lens system.

The example 1 in FIG. 1 comprises five lenses. The first lens group (e.g., L1a) of negative refractive power comprises, in order from the object side to the image side, two lenses, one a negative lens (e.g., G11a) of which the surface on the image side is a recessed meniscus shape, and a positive lens (e.g., G12a) of which the surface on the object side is a convex meniscus shape.

The second lens group (e.g., L2a) of positive refractive power comprises, in order from the object side to the image side, a positive lens of which both lens surfaces are convex shapes (e.g., G21a) with respect to the image side for the image side surface and with respect to the object side for the object side surface, and a negative lens (e.g., G22a) of which both lens surfaces are recessed shapes. Also, the third lens group (e.g., L3a) of positive refractive power comprises a positive lens (e.g., G31a) of which the surface on the image side is a recessed meniscus shape.

The example 2 in FIG. 4 comprises five lenses. The first and second lens groups (e.g., L1b) and (e.g., L2b) are similar to those in example 1 (e.g., G11b, G12b, G21b, and G22b).

The third lens group (e.g., L3b) of positive refractive power comprises a positive lens (e.g., G31b) of which both lens surfaces are convex shapes with respect to the image side for the image side surface and with respect to the object side for the object side surface.

The example 3 in FIG. 7 comprises four lenses. The first lens group (e.g., L1c) of negative refractive power comprises, in order from the object side to the image side, two lenses, one a negative lens (e.g., G11c and G12c) of which the surface on the image side is a recessed meniscus shape, and a positive lens (e.g., G12c) of which the surface on the object side is a convex meniscus shape.

The second lens group (e.g., L2c) of positive refractive power comprises a positive lens (e.g., G21c) of which both lens surfaces are convex shapes with respect to the image side for the image side surface and with respect to the object side for the object side surface. Also, the third lens group (e.g., L3c) of positive refractive power comprises a positive lens (e.g., G31c) of which both lens surfaces are convex shapes with respect to the image side for the image side surface and with respect to the object side for the object side surface.

The example 4 in FIG. 10 comprises six lenses. The first lens group (e.g., L1d) of negative refractive power comprises, in order from the object side to the image side, two lenses, one a negative lens (e.g., G11d) of which the surface on the image side is a recessed meniscus shape, and a positive lens (e.g., G12d) of which the surface on the object side is a convex meniscus shape.

The second lens group (e.g., L2d) of positive refractive power comprises, in order from the object side to the image side, three lenses, one a positive lens (e.g., G21d) of which both lens surfaces are convex shapes with respect to the image side for the image side surface and with respect to the object side for the object side surface, a negative lens (e.g., G22d) of which the surface on the object side is a convex meniscus shape, and a negative lens (e.g., G23d) of which both lens surfaces are recessed shapes. Also, the third lens group (e.g., L3d) of positive refractive power comprises a positive lens (e.g., G31d) of which both lens surfaces are convex shapes with respect to the image side for the image side surface and with respect to the object side for the object side surface.

The example 5 in FIG. 13 comprises seven lenses. The first lens group (e.g., L1e) of negative refractive power comprises, in order from the object side to the image side, two lenses, one a negative lens (e.g., G11e) of which the surface on the image side is a recessed meniscus shape, and a positive lens (e.g., G12e) of which the surface on the object side is a convex meniscus shape.

The second lens group (e.g., L2e) of positive refractive power comprises, in order from the object side to the image side, four lenses, one a positive lens (e.g., G21e) of which both lens surfaces are convex shapes with respect to the image side for the image side surface and with respect to the object side for the object side surface, similarly a positive lens (e.g., G22e) of which both lens surfaces are convex shapes with respect to the image side for the image side surface and with respect to the object side for the object side surface, a negative lens (e.g., G23e) of which both lens surfaces are recessed shapes, and a negative lens (e.g., G24e) of which the surface on the image side is a convex shape. Also, the third lens group (e.g., L3e) of positive refractive power comprises a positive lens of which both lens surfaces are convex shapes with respect to the image side for the image side surface and with respect to the object side for the object side surface.

As described above, the lens system can be reduced in size while maintaining appropriate optical performance by employing a lens configuration where desired refractive power distribution and aberration correction regarding the respective lens groups are realized.

The first lens group (e.g., L1a–L1e) has a role for subjecting the off-axis primary ray to pupil image formation centered on the diaphragm SP, and the amount of refraction of the off-axis primary ray is particularly great on the wide-angle side, so that off-axis aberrations, particularly astigmatism and distortion aberrations are readily caused. Consequently, with examples 1 through 5, the first lens group (e.g., L1a–L1e) comprises negative lenses and positive lenses, which prevent the lens effective diameter on the most object side from increase, as with the normal wide-angle lens system.

Astigmatism and distortion aberrations can be reduced in a balanced manner by employing the first lens group (e.g., L1a–L1e) where there can be an aspheric lens surface on the image side of a negative lens, and where the small number of lenses can result in a reduction in size of the entire lens system.

Next, the second lens group (e.g., L2a–L2e) can have a shape so as not to cause off-axis aberrations by comprising at least one positive lens of which both lens surfaces are convex shapes with respect to the image side for the image side surface and with respect to the object side for the object side surface, and reducing the refractive angle of the off-axis primary ray radiated from the first lens group (e.g., L1a–L1e). Also, the positive lenses of which the height where an on-axis ray passes through is the highest, can principally contribute to the reduction of spherical aberrations and coma aberrations. Also, in at least one exemplary embodiment the lens surface on the object side of the positive lens can be an aspheric surface. Thus, spherical aberrations and coma aberrations are readily reduced in an appropriate manner.

Also, with examples 1 and 2, the negative lens can be disposed on the image surface side of the positive lens, where reduction of on-axis chromatic aberrations and magnification chromatic aberrations can be performed, which is difficult by the positive lens alone. Further, with examples 4 and 5, aberration reduction is effectively performed by increasing the number of lenses.

Next, the third lens group (e.g., L3a–L3e) comprises a positive lens of which both lens surfaces can be convex shapes with respect to the image side for the image side surface and with respect to the object side for the object side surface, or have a positive lens of which the surface on the image side is a recessed meniscus shape. As with examples 1, 2, and 3 where the number of lenses to be configured can be small, the surface on the object side of the positive lens of the third lens group can be aspheric in shape, and thus, off-axis aberrations in the entire zoom region can be reduced in an appropriate manner.

Next, the examples 6 through 8 in FIG. 16, 19, and 22 will be described.

The zoom lenses according to the examples 6 through 8 comprise, in order from the object side to the image side, three lens groups of the first lens group (e.g., L1f–L1h) of negative refractive power, the second lens group (e.g., L2f–L2h) of positive refractive power, and the third lens group (e.g., L3f–L3h) of negative refractive power, and when zooming from the wide-angle end to the telephoto end, the first lens group (e.g., L1f–L1h) moves (e.g., A5–A7) to the image side so as to draw a convex locus, the diaphragm SP and the second lens group (e.g., L2f–L2h) moves (e.g., B5–B7) to the object side integrally, and the third lens group (e.g., L3f–L3h) moves (e.g., C5–C7) to the object side with the amount of movement which can be different from the second lens group (e.g., L2f–L2h).

These zoom lenses perform principal change in power by moving the second lens group (e.g., L2f–L2h), where movement of a image point along with change in power is corrected by moving the first lens group (e.g., L1f–L1h) to the image side so as to draw a convex locus (e.g., A5–A7). Also, the outer diameters of the lenses making up the first lens group (e.g., L1f–L1h) are prevented from increase by disposing the diaphragm SP on the most object side of the second lens group (e.g., L2f–L2h) to reduce the distance between the incident pupil on the wide-angle side and the first lens group (e.g., L1f–L1h). Where appropriate optical performance is obtained without increasing the number of lenses to be configured by reducing the off-axis aberrations with the first lens group (e.g., L1f–L1h) and the third lens group (e.g., L3f–L3h) which sandwich the diaphragm SP disposed on the object side of the second lens group (e.g., L2f–L2h).

With the zoom lenses according to the examples 6 through 8, the first lens group (e.g., L1f–L1h) comprises at least one negative lens (e.g., G11f, G11g, G11h) and one positive lens (e.g., G12f, G12g, G12h) in a 3-group configuration. The number of lenses to be configured can vary but in the non limiting examples provided there can be seven or less lenses in the entire lens system.

The example 6 in FIG. 16 comprises five lenses. The first lens group (e.g., L1f) of negative refractive power comprises, in order from the object side to the image side, two lenses, one a negative lens(e.g., G11f) of which both lens surfaces are recessed shapes, and a positive lens (e.g., G12f) of which the surface on the object side is a convex meniscus shape.

The second lens group (e.g., L2f) of positive refractive power comprises, in order from the object side to the image side, a positive lens (e.g. G21f) of which both lens surfaces are convex shapes with respect to the image side for the image side surface and with respect to the object side for the object side surface, and a negative lens (e.g., G22f) of which both lens surfaces are recessed shapes.

Also, the third lens group (e.g., L3f) of negative refractive power comprises a negative lens (e.g., G31f) of which the surface on the object side is a recessed meniscus shape. The example 7 in FIG. 19 comprises at least six lenses.

The first lens group (e.g., L1g) of negative refractive power comprises, in order from the object side to the image side, two lenses, one a negative lens (e.g., G11g) of which the surface on the image side is a recessed meniscus shape, and a positive lens (e.g., G12g) of which the surface on the object side is a convex meniscus shape.

The second lens group (e.g., L2g) of positive refractive power comprises, in order from the object side to the image side, three lenses, one a positive lens (e.g., G21g) of which both lens surfaces are convex shapes with respect to the image side for the image side surface and with respect to the object side for the object side surface, a negative lens (e.g., G22g) of which the surface on the object side is a recessed meniscus shape, and a positive lens (e.g., G23g) of which both lens surfaces are convex shapes with respect to the image side for the image side surface and with respect to the object side for the object side surface, and the positive lens near the object side and the negative lens make up a combined lens.

Also, the third lens group (e.g., L3g) of negative refractive power comprises a negative lens (e.g., G31g) of which both lens surfaces are recessed shapes.

The example 8 in FIG. 22 comprises seven lenses. The first lens group (e.g., L1h) of negative refractive power comprises, in order from the object side to the image side, two lenses, one a negative lens (e.g., G11h) of which the surface on the image side is a recessed meniscus shape, and a positive lens (e.g., G12h) of which the surface on the object side is a convex meniscus shape.

The second lens group (e.g., L2h) of positive refractive power comprises, in order from the object side to the image side, three lenses, one a positive lens (e.g., G21h) of which both lens surfaces are convex shapes with respect to the image side for the image side surface and with respect to the object side for the object side surface, a negative lens (e.g., G22h) of which both lens surfaces are recessed shapes, and a positive lens (e.g., G23h) of which both lens surfaces are convex shapes with respect to the image side for the image side surface and with respect to the object side for the object side surface, and the positive lens near the object side and the negative lens make up a combined lens.

Also, the third lens group (e.g., L3h) of negative refractive power comprises two negative lenses (e.g., G31h and G32h), each of which the surface on the object side is a recessed meniscus shape, and the both lenses make up a combined lens.

As described above, the lens system can be reduced in size while maintaining appropriate optical performance by employing a lens configuration wherein desired refractive power distribution and aberration correction regarding the respective lens groups are realized at the same time.

As with the zoom lenses having three lens groups of negative, positive, and positive refractive power according to the examples 1 through 5, the first lens group (e.g., L1f–L1h) has a role for subjecting the off-axis primary ray to pupil image formation centered on the diaphragm, and the amount of refraction of the off-axis primary ray is particularly great on the wide-angle side, so that off-axis aberrations, particularly astigmatism and distortion aberrations are readily caused.

Consequently, with the examples 6 through 8, the first lens group (e.g., L1f–L1h) comprises negative lenses and positive lenses, which prevent the lens diameter on the most object side from increase, as with the normal wide-angle lens system.

Astigmatism and distortion aberrations can be reduced in a balanced manner by employing the first lens group (e.g., L1f–L1h) where there can be an aspheric lens surface on the image side of a negative lens, and where the small number of lenses can result in reduction in a reduction in size of the entire lens.

Next, the second lens group (e.g., L2f–L2h) has a shape so as not to cause off-axis aberrations by disposing a positive lens of which both lens surfaces are convex shapes on the most object side, and reducing the refractive angle of the off-axis primary ray radiated from the first lens group (e.g., L1f–L1h).

Also, the positive lenses, of which height wherein an on-axis ray passes through is the highest, principally contribute to reduction of spherical aberrations and coma aberrations.

In at least one exemplary embodiment, the lens surface on the object side of the positive lens can be an aspheric surface. Thus, spherical aberrations and coma aberrations are readily reduced in an appropriate manner.

Also, with regards to example 6, the negative lens (e.g., G22f) is disposed on the image surface side of the positive lens (e.g., G21f), and reduction of on-axis chromatic aberrations and magnification chromatic aberrations can be performed, which is difficult using the positive lens alone. Further, with the examples 7 and 8, aberration reduction is effectively performed by increasing the number of lenses.

Next, the third lens group (e.g., L3a–L3j) comprises a negative lens of which both lens surfaces are recessed shapes, or a negative lens of which the surface on the image side is a recessed meniscus shape. This third lens group (e.g., L3f–L3g) flips up a ray to reduce back focus, so one surface, in an aspheric shape, can be employed to reduce off-axis halo and coma aberrations.

Next, the example 9 in FIG. 25 will be described. The zoom lens according to example 9 comprises, in order from the object side to the image side, four lens groups, further comprising the first lens group (e.g., L1i) of negative refractive power, the second lens group (e.g., L2i) of positive refractive power, the third lens group (e.g., L3i) of negative refractive power, and the fourth lens group (e.g., L4i) of positive refractive power. When zooming from the wide-angle end to the telephoto end, the first lens group (e.g., L1i) moves (e.g., A8) to the image side so as to draw a convex locus, the diaphragm SP and the second lens group (e.g., L2i) move (e.g., B8) to the object side integrally, the third lens group (e.g., L3i) moves (e.g., C8) to the object side, and the fourth lens group (e.g., L4i) can be fixed.

The zoom lens according to the example 9 can perform principal changes in power by moving the second lens group (e.g., L2i), where movement of a image point along with change in power is corrected by moving the first lens group (e.g., L1i) to the image side so as to draw a convex locus. Also, the effective outer diameters of the lenses making up the first lens group (e.g., L1i) are prevented from increase by disposing the diaphragm SP on the most object side of the second lens group (e.g., L2i) to reduce the distance between the incident pupil on the wide-angle side and the first lens group (e.g., L1i). Appropriate optical performance can be obtained without increasing the number of lenses to be configured by reducing the off-axis aberrations with the first lens group (e.g., L1i), the third lens group (e.g., L3i), and the fourth lens group (e.g., L4i) which sandwich the diaphragm SP disposed on the object side of the second lens group (e.g., L2i).

With the zoom lens according to the example 9, the first lens group (e.g., L1i) comprises at least one negative lens (e.g., G11i) and one positive lens (e.g., G12i) in a 4-group configuration. The number of lenses can be a variety of values, but the non-limiting examples are configured to comprise seven or less.

With the example 9 in FIG. 25, the first lens group (e.g., L1i) of negative refractive power comprises, in order from the object side to the image side, two lenses, one a negative lens (e.g., G11i) of which the surface on the image side is a recessed meniscus shape, and a positive lens (e.g., G12i) of which the surface on the object side is a convex meniscus shape.

The second lens group (e.g., L2i) of positive refractive power comprises, in order from the object side to the image side, three lenses, one a positive lens (e.g., G21i) of which both lens surfaces are convex shapes with respect to the image side for the image side surface and with respect to the object side for the object side surface, similarly a positive lens (e.g., G22i) of which both lens surfaces are convex shapes, and a negative lens (e.g., G23i) of which both lens surfaces are recessed shapes.

The third lens group (e.g., L3i) of positive refractive power comprises a positive lens (e.g., G31i) of which both lens surfaces are convex shapes with respect to the image side for the image side surface and with respect to the object side for the object side surface.

As described above, the lens system can be reduced in size while maintaining appropriate optical performance by employing a lens configuration where desired refractive power distribution and aberration reduction, regarding the respective lens groups, are realized.

Also, the zoom lens according to the example 9 can achieve further optical high performance while maintaining the same optical total length, by dividing the second lens group (e.g., L2i) of the zoom lens having three lens groups of negative, positive, and positive refractive power of the examples 1 through 5 into two groups, a positive lens group and a negative lens group to divide a zoom mechanism.

Next, the example 10 in FIG. 28 will be described. The zoom lens according to example 10 comprises, in order from the object side to the image side, four lens groups, further comprising the first lens group (e.g., L1j) of negative refractive power, the second lens group (e.g., L2j) of positive refractive power, the third lens group (e.g., L3j) of positive refractive power, and the fourth lens group (e.g., L4j) of negative refractive power. When zooming from the wide-angle end to the telephoto end, the first lens group (e.g., L1j) moves (e.g. A9) to the image side so as to draw a convex locus, the diaphragm SP and the second lens group (e.g., L2j) moves (e.g., B9) to the object side integrally, and also the third lens group (e.g., L3j) and the fourth lens group (e.g., L4j) moves (e.g., C9 and D9) to the object side.

The zoom lens according to the example 10 can perform principal changes in power by moving (e.g., B9) the second lens group (e.g., L2j), and movement of a image point along with change in power is corrected by moving (e.g., A9) the first lens group (e.g., L1j) to the image side so as to draw a convex locus. Also, the effective outer diameters of the lenses making up the first lens group (e.g., L1j) are prevented from increase by disposing the diaphragm SP on the most object side of the second lens group (e.g., L2j) to reduce the distance between the incident pupil on the wide-angle side and the first lens group (e.g., L1j). Appropriate optical performance can be obtained without increasing the number of lenses to be configured by reducing the off-axis aberrations with the first lens group (e.g., L1j), the third lens group (e.g., L3j), and the fourth lens group (e.g., L4j) which sandwich the diaphragm SP disposed on the object side of the second lens group (e.g., L2j).

With the zoom lens according to the example 10, the first lens group (e.g., L1j) comprises at least one negative lens and one positive lens in a 4-group configuration. The number of lenses to be configured can vary but in the examples provided the number can be seven or less in all.

With the example 10 in FIG. 28, the first lens group (e.g., L1j) of negative refractive power comprises, in order from the object side to the image side, two lenses, one a negative lens (e.g., G11j) of which the surface on the image side is a recessed meniscus shape, and a positive lens (e.g., G12j) of which the surface on the object side is a convex meniscus shape.

The second lens group (e.g., L2j) of positive refractive power comprises, in order from the object side to the image side, two lenses, one a positive lens (e.g., G21j) of which both lens surfaces are convex shapes with respect to the image side for the image side surface and with respect to the object side for the object side surface, and a negative lens (e.g., G22j) of which the surface on the object side is a recessed shape.

Also, the third lens group (e.g., L3j) of positive refractive power comprises a positive lens (e.g., G31j) of which the surface on the image side is a convex shape, and the fourth lens group (e.g., L4j) of negative refractive power comprises two negative lenses (e.g., G41j and G42j) each of which the surface on the object side is a recessed meniscus shape.

As described above, the lens system can be reduced in size while maintaining appropriate optical performance by employing a lens configuration where desired refractive power distribution and aberration reduction regarding the respective lens groups are realized.

Also, the zoom lens according to the example 10 can achieve further optical high performance while maintaining the same optical total length, by dividing the second lens group (e.g., L2j) of the zoom lens having three lens groups of negative, positive, and negative refractive power in the examples 6 through 8 into two positive lens groups to divide a zoom mechanism.

As described above, according to the respective examples, the zoom lens made up of three groups or more even with a small number of lenses to be configured can handle a mega-pixel or more imaging device, and can achieve appropriate optical performance by setting refractive power of each lens group while realizing reduction in size of the entire lens system.

Next, numerical examples of the present invention will be shown. Note that with the numerical examples, i represents a sequential order from the object side, Ri represents the radius of curvature of the i'th surface in order from the object side, Di represents the i'th lens thickness and air interval in order from the object side, and Ni and vi represent the refraction index and Abbe number at the d line of the i'th material in order from the object side.

If we say that the optical axis direction is the X axis, the direction perpendicular to the optical axis is the H axis, the progressive direction of light is positive, R is a paraxial radius of curvature, k is eccentricity, B, C, D, and E are aspheric coefficients respectively, an aspheric shape is represented with the following expression.

[Equation 1]

$$X = \frac{\left(\frac{1}{r}\right)H^2}{1+\sqrt{\left(1-(1+k)\left(\frac{H}{r}\right)^2\right)}} + BH^4 + CH^6 + DH^8 + EH^{10}$$

Also, for example, display of "e-Z" means "$10^{-Z}$". f represents a focal distance, Fno represents an F number, and ω represents a half field angle.

Also, the relations between the above respective conditional expressions and the respective numerical examples are shown in Table 1.

NUMERICAL EXAMPLE 1 f=3.80 to 7.15 Fno=3.20 to 4.54 2ω=63.2° to 34.9°
R1=12.009 D1=0.50 N1=1.530410 ν1=56.0
R2=2.251 D2=0.54
R3=2.125 D3=0.95 N2=1.859600 ν2=40.4
R4=2.188 D4=variable
R5=diaphragm D5=0.10
R6=1.983 D6=1.00 N3=1.773470 ν3=47.2
R7=−4.161 D7=0.38
R8=−7.251 D8=0.50 N4=1.906808 ν4=21.2
R9=2.344 D9=variable
R10=−311.442 D10=1.30 N5=1.583060 ν5=30.2
R11=−3.144 D11=0.50
R12=∞ D12=0.70 N6=1.516330 ν6=64.1
R13=∞
\focal distance 3.80 5.07 7.15
variable interval\
D4 2.89 1.51 0.30
D9 1.21 1.94 3.15
aspheric coefficient
R2 k=−1.83986E−01 B=1.24001E−02 C=2.19434E−03 D=3.41949E−04 E=−1.95515E−05
R3 k=−4.15194E−01 B=9.22038E−03 C=1.94799E−04 D=8.35231E−04 E=−1.13528E−04
R6 k=−1.25416E+00 B=6.00255E−03 C=−6.33555E−03 D=2.80526E−03 E=−8.30079E−04
R9 k=3.88096E+00 B=8.73855E−03 C=−5.27851E−02 D=8.25766E−02 E=−8.04026E−02
R10 k=−2.10600E+06 B=−4.49747E−03 C=6.97414E−04 D=−1.15875E−04 E=6.32031E−06

NUMERICAL EXAMPLE 2 f=3.80 to 7.14 Fno=3.50 to 5.04 2ω=63.3° to 34.8°
R1=110.952 D1=0.50 N1=1.524700 ν1=56.2
R2=1.891 D2=0.43
R3=2.375 D3=0.95 N2=1.882997 ν2=40.8
R4=3.387 D4=variable
R5=diaphragm D5=0.10
R6=2.152 D6=1.00 N3=1.773770 ν3=47.2
R7=−4.522 D7=0.33
R8=−12.838 D8=0.50 N4=1.906808 ν4=21.2
R9=2.421 D9=variable
R10=10.891 D10=1.30 N5=1.583060 ν5=30.2
R11=−6.131 D11=0.50
R12=∞ D12=0.70 N6=1.516330 ν6=64.1
R13=∞
\focal distance 3.80 5.27 7.14
variable interval\
D4 2.79 1.31 0.30
D9 1.34 2.44 3.83
aspheric coefficient
R2 k=−4.71683E−02 B=−2.92201E−03 C=7.77841E−04 D=−3.80306E−04 E=−1.76887E−04
R6 k=−1.09780E+00 B=2.33860E−03 C=−1.08221E−03 D=−4.54431E−03 E=3.51702E−03
R9 k=5.15712E−01 B=2.52169E−02 C=−1.64825E−03 D=1.99190E−02 E=−1.39614E−02
R10 k=2.60279E+00 B=−2.26755E−03 C=9.18031E−04 D=−1.50534E−04 E=9.98272E−06

NUMERICAL EXAMPLE 3 f=3.75 to 7.50 Fno=3.72 to 5.70 2ω=54.3° to 25.8°
R1=4.797 D1=1.20 N1=1.901355 ν1=31.6
R2=2.334 D2=0.59
R3=3.600 D3=1.20 N2=1.846660 ν2=23.8
R4=4.900 D4=variable
R5=diaphragm D5=0.15
R6=5.630 D6=0.85 N3=1.487490 ν3=70.2
R7=−5.110 D7=variable
R8=7.544 D8=0.97 N4=1.487490 ν4=70.2
R9=−24.379 D9=variable
R10=∞ D10=0.30 N5=1.516330 ν5=64.1
R11=∞
\focal distance 3.75 5.12 7.50
variable interval\
D4 5.28 3.71 1.50
D7 0.70 4.03 6.87
D9 3.05 1.76 0.66
aspheric coefficient
R2 k=−6.27185E−01 B=5.08216E−03 C=1.61761E−04 D=2.61937E−05 E=1.25814E−05
R6 k=−1.65518E+01 B=−1.21900E−02 C=1.16042E−01 D=−2.60088E−01 E=2.08789E−01
R8 k=−1.97176E+01 B=9.91648E−06 C=1.22098E−04 D=−5.96814E−05 E=−4.32276E−05

NUMERICAL EXAMPLE 4 f=3.80 to 7.60 Fno=3.00 to 4.47 2ω=63.1° to 33.1°
R1=9.236 D1=0.65 N1=1.677900 ν1=54.9
R2=1.944 D2=0.41
R3=2.492 D3=1.00 N2=1.882997 ν2=40.8
R4=3.921 D4=variable
R5=diaphragm D5=0.18
R6=2.228 D6=1.00 N3=1.772499 ν3=49.6
R7=−6.528 D7=0.15
R8=18.631 D8=0.50 N4=1.846660 ν4=23.8
R9=2.412 D9=0.27
R10=−42.867 D10=0.60 N5=1.696797 ν5=55.5
R11=9.011 D11=variable
R12=6.843 D12=1.20 N6=1.603112 ν6=60.6
R13=−9.077 D13=0.50
R14=∞ D14=0.70 N7=1.516330 ν7=64.1
R15=∞
\focal distance 3.80 5.73 7.60
variable interval\
D4 3.54 1.36 0.30
D11 0.53 2.18 3.77
aspheric coefficient R2 k=−2.06707E−01 B=−5.27341E−04 C=−3.76928E−04
  D=4.42461E−04 E=−1.40772E−04
R6 k=−8.75641E−01 B=4.90884E−04 C=−2.31194E−03
  D=1.32327E−03 E=−7.14101E−04
R9 k=3.64402E+00 B=1.48176E−03 C=−2.76030E−02
  D=4.16267E−02 E=−4.29133E−02

NUMERICAL EXAMPLE 5 f=3.82 to 9.47 Fno=3.00 to 5.23 2ω=58.6° to 25.9°
R1=6.137 D1=0.65 N1=1.772499 ν1=49.6
R2=1.957 D2=0.66
R3=2.855 D3=1.20 N2=1.882997 ν2=40.8
R4=4.490 D4=variable
R5=diaphragm D5=0.10
R6=3.004 D6=0.90 N3=1.772499 ν3=49.6
R7=−13.537 D7=0.15
R8=8.377 D8=0.90 N4=1.693501 ν4=53.2
R9=−8.678 D9=0.15
R10=−9.278 D10=0.50 N5=1.805181 ν5=25.4
R11=2.394 D11=0.27
R12=−19.441 D12=0.80 N6=1.696797 ν6=55.5
R13=−35.497 D13=variable
R14=6.827 D14=1.20 N7=1.804000 ν7=46.6
R15=−29.076 D15=0.50
R16=∞ D16=0.70 N8=1.516330 ν8=64.1
R17=∞
\focal distance 3.82 6.53 9.47
variable interval\
D4 4.68 1.63 0.30
D13 0.90 3.00 5.28
aspheric coefficient
R2 k=−4.36329E−01 B=1.46729E−03 C=3.30080E−05
  D=1.67504E−04 E=−3.21645E−05
R6 k=−3.33822E+00 B=1.15718E−02 C=−7.46191E−04
  D=−1.48352E−03 E=6.38501E−04
R11 k=3.57938E+00 B=−1.80595E−02 C=−1.96791E−02
  D=1.66866E−02 E=−2.87093E−02

NUMERICAL EXAMPLE 6 f=3.75 to 7.50 Fno=3.37 to 5.22 2ω=66.0° to 33.0°
R1=−31.370 D1=0.70 N1=1.868227 ν1=31.2
R2=2.385 D2=0.35
R3=3.016 D3=1.00 N2=1.850000 ν2=23.0
R4=11.332 D4=variable
R5=diaphragm D5=0.20
R6=1.527 D6=1.18 N3=1.542380 ν3=65.2
R7=−5.292 D7=0.15
R8=−4.114 D8=0.80 N4=1.845205 ν4=23.1
R9=−17.586 D9=variable
R10=−1.947 D10=0.70 N5=1.487000 ν5=70.4
R11=−6.236 D11=0.20
R12=∞ D12=0.50 N6=1.516330 ν6=64.1
R13=∞
\focal distance 3.75 5.65 7.50
variable interval\
D4 2.76 1.13 0.40
D9 1.66 1.45 1.23
D11 0.20 1.87 2.99
aspheric coefficient
R2 k=6.23484E−01 B=−9.88389E−03 C=−2.35847E−04
  D=−5.20928E−04 E=−2.12030E−04
R6 k=−2.99906E−01 B=−3.75172E−03 C=1.01588E−02
  D=−8.87873E−03 E=4.27479E−03
R9 k=−2.70484E+02 B=3.21988E−02 C=2.48046E−02
  D=−6.15934E−03 E=2.07440E−02

R10 k=1.61416E−03 B=−8.48671E−04 C=−8.92357E−03
  D=9.84619E−03 E=−1.27776E−03

NUMERICAL EXAMPLE 7 f=2.79 to 5.57 Fno=3.00 to 4.61 2ω=69.8° to 35.8°
R1=14.782 D1=0.51 N1=1.882997 ν1=40.8
R2=2.234 D2=0.74
R3=3.096 D3=0.84 N2=1.846660 ν2=23.8
R4=6.267 D4=variable
R5=diaphragm D5=0.26
R6=2.408 D6=0.95 N3=1.563839 ν3=60.7
R7=−3.221 D7=0.43 N4=1.846660 ν4=23.8
R8=−12.371 D8=1.52
R9=5.133 D9=0.62 N5=1.516330 ν5=64.1
R10=−7.862 D10=variable
R11=−2.754 D12=0.47 N6=1.487490 ν6=70.2
R12=16.499 D13=variable
R13=∞ D14=0.30 N7=1.490000 ν7=75.0
R14=∞ D15=0.05
R15=∞ D16=0.50 N8=1.516330 ν8=64.1
R16=∞
\focal distance 2.79 4.61 5.57
variable interval\
D4 3.89 1.51 1.05
D10 1.49 1.10 0.84
D13 0.10 1.65 2.68
aspheric coefficient
R2 k=−2.67696E−01 B=−1.17604E−03 C=2.20580E−04
  D=−1.61847E−04 E=1.01800E−05
R6 k=−2.21639E−01 B=−2.31388E−03 C=−1.94769E−03
  D=2.42509E−03 E=−1.02147E−03
R10 k=−4.50080E+00 B=6.18556E−03 C=2.71709E−03
  D=1.17700E−03 E=2.72155E−06
R12 k=−7.31943E+00 B=−1.20829E−03 C 2.73391E−03
  D=−1.84267E−03 E=1.75533E−04

NUMERICAL EXAMPLE 8 f=3.80 to 7.37 Fno=2.88 to 4.15 2ω=63.2° to 33.6°
R1=45.450 D1=0.60 N1=1.882997 ν1=40.8
R2=2.428 D2=0.67
R3=3.655 D3=0.70 N2=1.805181 ν2=25.4
R4=14.200 D4=variable
R5=diaphragm D5=0.10
R6=3.413 D6=0.77 N3=1.802380 ν3=40.6
R7=−4.793 D7=0.28 N4=1.846660 ν4=23.9
R8=6.802 D8=0.52
R9=5.396 D9=0.69 N5=1.487490 ν5=70.2
R10=−4.197 D10=variable
R11=−2.368 D11=0.40 N6=1.683780 ν6=31.1
R12=−3.771 D12=1.00 N7=1.834807 ν7=42.7
R13=−4.878 D13=variable
R14=∞ D14=0.70 N8=1.516330 ν8=64.1
R15=∞
\focal distance 3.80 5.41 7.37
variable interval\
D4 3.86 1.61 0.29
D10 2.31 2.20 2.00
D13 0.42 1.63 3.30
aspheric coefficient
R2 k=−2.78573E+00 B=1.89234E−02 C=−9.34853E−04
  D=−9.77228E−06 E=1.00530E−05
R6 k=−1.69681E+00 B=9.70522E−04 C=−6.81401E−04
  D=−4.84420E−05 E=3.19262E−05
R11 k=6.86797E−01 B=−9.09303E−03 C=2.03239E−03
  D=−3.21742E−03 E=9.30778E−04

NUMERICAL EXAMPLE 9 f=3.81 to 9.50 Fno=3.00 to 5.31 2ω=58.7° to 26.0°
R1=5.946 D1=0.70 N1=1.788001 ν1=47.4
R2=1.970 D2=0.69
R3=2.892 D3=1.20 N2=1.882997 ν2=40.8
R4=4.522 D4=variable
R5=diaphragm D5=0.10
R6=2.987 D6=0.90 N3=1.772499 ν3=49.6
R7=−14.274 D7=0.15
R8=8.018 D8=0.90 N4=1.696797 ν4=55.5
R9=−8.169 D9=0.15
R10=−9.105 D10=0.50 N5=1.805181 ν5=25.4
R11=2.388 D11=variable
R12=−11.451 D12=0.65 N6=1.696797 ν6=55.5
R13=−95.676 D13=variable
R14=6.041 D14=1.40 N7=1.804000 ν7=46.6
R15=−16.435 D15=0.50
R16=∞ D16=0.70 N8=1.516330 ν8=64.1
R17=∞
\focal distance 3.81 6.68 9.50
variable interval\
D4 4.57 1.50 0.30
D11 0.56 1.31 1.91
D13 0.55 2.02 3.54
aspheric coefficient
R2 k=−4.90593E−01 B=2.30689E−03 C=3.31740E−04
 D=5.93882E−05 E=−7.87841E−06
R6 k=−3.29528E+00 B=1.15539E−02 C=−6.90432E−04
 D=−1.50807E−03 E=6.53520E−04
R11 k=3.31062E+00 B=−1.70764E−02 C=−1.02641E−02
 D=5.11689E−03 E=−1.77804E−02
R13 k=−8.66766E+02 B=2.48248E−03 C=−1.78069E−04
 D=−1.16401E−04 E=1.08022E−05

NUMERICAL EXAMPLE 10 f=3.80 to 7.50 Fno=2.88 to 4.27 2ω=63.1° to 33.2°
R1=24.510 D1=0.60 N1=1.882997 ν1=40.8
R2=2.202 D2=0.65
R3=3.110 D3=0.70 N2=1.784723 ν2=25.7
R4=10.451 D4=variable
R5=diaphragm D5=0.10
R6=3.102 D6=0.96 N3=1.802380 ν3=40.6
R7=−2.198 D7=0.55 N4=1.846660 ν4=23.9
R8=−28.385 D8=variable
R9=−9.004 D9=0.82 N5=1.487490 ν5=70.2
R10=−3.619 D10=variable
R11=−1.693 D11=0.80 N6=1.683780 ν6=31.1
R12=−5.256 D12=1.00 N7=1.882997 ν7=40.8
R13=−3.926 D13=variable
R14=∞ D14=0.70 N8=1.516330 ν8=64.1
R15=∞
\focal distance 3.80 5.57 7.50
variable interval\
D4 3.94 1.62 0.35
D8 0.65 0.39 0.42
D10 1.38 1.27 1.09
D13 0.42 2.28 4.03
aspheric coefficient
R2 k=−2.75498E+00 B=2.56422E−02 C=−1.81802E−03
 D=3.16960E−04 E=−3.06669E−05
R6 k=−7.04743E−01 B=−3.45818E−04 C=1.00069E−04
 D=−2.79380E−04 E=4.38119E−05
R11 k=1.12788E−01 B=−1.29336E−02 C=−2.17110E−03
 D=−1.32894E−03 E=6.03417E−04

TABLE 1

| CONDITIONAL EXPRESSION | EXAMPLE 1 | EXAMPLE 2 | EXAMPLE 3 | EXAMPLE 4 | EXAMPLE 5 |
|---|---|---|---|---|---|
| (1) ft/fw | 1.88 | 1.88 | 2.00 | 2.00 | 2.48 |
| (2) \|f1\|/f2 | 2.29 | 1.91 | 2.13 | 1.95 | 1.90 |
| (3) R11/R12 | 5.33 | 58.68 | 2.06 | 4.75 | 3.14 |
| (4) R13/R14 | 0.97 | 0.70 | 0.73 | 0.64 | 0.64 |
| (5) ν11/ν12 | 1.37 | 1.37 | 1.33 | 1.35 | 1.22 |
|  | EXAMPLE 6 | EXAMPLE 7 | EXAMPLE 8 | EXAMPLE 9 | EXAMPLE 10 |
| (1) ft/fw | 2.00 | 2.00 | 1.94 | 2.49 | 1.97 |
| (2) \|f1\|/f2 | 1.98 | 1.83 | 1.91 | 2.04 | 1.83 |
| (3) R11/R12 | 13.15 | 6.62 | 18.72 | 3.02 | 11.13 |
| (4) R13/R14 | 0.27 | 0.49 | 0.26 | 0.64 | 0.30 |
| (5) ν11/ν12 | 1.35 | 1.71 | 1.60 | 1.16 | 1.59 |

Next, an example of an imaging apparatus employing a zoom lens according to at least one exemplary embodiment will be described with reference to FIG. 31.

In FIG. 31, reference numeral 1 denotes a cellular phone main unit, reference numeral 2 denotes an imaging module on which a zoom lens 4 according to the present invention is mounted, and comprises the zoom lens 4 and an imaging device 5. Reference numeral 6 denotes recording means for recording image data taken by the imaging module 2, and reference numeral 7 denotes a liquid crystal display unit for displaying the taken image of a subject at the time of taking images or reproducing.

Thus, high quality images can be provided by small portable equipment (e.g., cellular phones, PDA, laptop computers, pagers, and other small portable equipment as known by one of ordinary skill in the relevant arts and equivalents) applying a zoom lens according to at least one exemplary embodiment.

Next, an example of a digital still camera (imaging apparatus) employing a zoom lens according to at least one exemplary embodiment as a photographing optical system will be described with reference to FIG. 32.

In FIG. 32, reference numeral 20 denotes a camera main unit, reference 21 denotes a photographing optical system made up of the zoom lens according to the present invention, reference numeral 22 denotes a solid state imaging device (photoelectric transfer device) (e.g., a CCD sensor, CMOS sensor) for receiving a subject image formed by the photographing optical system 21, reference numeral 23 denotes memory for recording information corresponding to a subject image subjected to photoelectric transfer by the imaging device 22, and reference numeral 24 denotes a finder, made up of a liquid crystal display panel or other image display systems as known by one of ordinary skill in the relevant art, for observing a subject image formed on the solid state imaging device 22.

Thus, a small imaging apparatus, having high optical performance, can be realized by applying a zoom lens according to at least one exemplary embodiment to an imaging apparatus (e.g., a digital still camera or other imaging apparatus as known by one of ordinary skill in the relevant art).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-304217 filed Oct. 19, 2004, which is hereby incorporated by reference herein in its entirety.

What is claimed is:

1. A zoom lens, comprising in order from the object side to the image side:
a first lens group of negative refractive power;
a second lens group of positive refractive power; and
a third lens group,
wherein the first lens group and the second lens group move at the time of zooming,
and wherein the first lens group consists, in order from the object side to the image side,
a first lens of negative refractive power, and
a second lens of positive refractive power,
wherein said first lens group moves to the image side so as to draw a convex locus at the time of zooming from the wide-angle end to the telephoto end, and said second lens group moves to the object side, and
wherein, with the focal distance of the first lens group as f1, the focal distance of the second lens group as f2, the focal distance of the entire system at the wide-angle end as fw, and the focal distance of the entire system at the telephoto end as ft, the following conditions are satisfied:

$1.5 \leq ft/fw$; and $1.75 < |f1|/f2 < 2.5$.

2. The zoom lens according to claim 1, wherein the third lens group has a positive refractive power.

3. The zoom lens according to claim 1, wherein the number of lenses in the entire system is less than eight.

4. The zoom lens according to claim 1, wherein back focus at the wide-angle end is less than 2.5 mm.

5. The zoom lens according to claim 1, wherein the distance from the first lens surface on the object side to the image surface is less than 17 mm.

6. An imaging apparatus comprising:
the zoom lens according to claim 1; and
a solid state imaging device for receiving an image formed by said zoom lens.

7. A zoom lens, comprising in order from the object side to the image side:
a first lens group of negative refractive power;
a second lens group of positive refractive power;
a third lens group of negative refractive power; and
a fourth lens group of positive refractive power,
wherein the first lens group and the second lens group move at the time of zooming,
and wherein the first lens group consists, in order from the object side to the image side,
a first lens of negative refractive power, and
a second lens of positive refractive power,
wherein, with the focal distance of the first lens group as f1, the focal distance of the second lens group as f2, the focal distance of the entire system at the wide-angle end as fw, and the focal distance of the entire system at the telephoto end as ft, the following conditions are satisfied:

$1.5 \leq ft/fw$; and $1.75 < |f1|/f2 < 2.5$.

8. The zoom lens according to claim 7, wherein said first lens group moves to the image side so as to draw a convex locus at the time of zooming from the wide-angle end to the telephoto end, and said second lens group moves to the object side.

9. The zoom lens according to claim 7, wherein the first lens is a lens of negative refractive power of which the surface on the object side is a convex meniscus shape, and the second lens is a lens of positive refractive power of which the surface on the object side is a convex meniscus shape, and
wherein, with the curvature radii on the object side and on the image side of the first lens as R11 and R12 respectively, and the curvature radii on the object side and on the image side of the second lens as R13 and R14 respectively, the following conditions are satisfied:

$1.5 < |R11/R12|$; and $|R13/R14| < 1.2$.

10. The zoom lens according to claim 9, wherein with the Abbe numbers of the materials of the first lens and the second lens as v11 and v12 respectively, the following condition is satisfied:

$1.0 < v11/v12$.

11. The zoom lens according to claim 7, wherein the number of lenses in the entire system is less than eight.

12. The zoom lens according to claim 7, wherein back focus at the wide-angle end is less than 2.5 mm.

13. The zoom lens according to claim 7, wherein the distance from the first lens surface on the object side to the image surface is less than 17 mm.

14. An imaging apparatus comprising:
the zoom lens according to claim 7; and
a solid state imaging device configured to receive an image formed by the zoom lens.

15. A zoom lens, comprising in order from the object side to the image side:
a first lens group of negative refractive power;
a second lens group of positive refractive power;
a third lens group of positive refractive power; and
a fourth lens group of negative refractive power,
wherein the firs lens group and the second lens group move at the time of zooming,
and wherein the first lens group consists, in order from the object side to the image side,
a first lens of negative refractive power, and
a second lens of positive refractive power,
wherein, with the focal distance of the first lens group as f1, the focal distance of the second lens group as f2, the focal distance of the entire system at the wide-angle end as fw, and the focal distance of the entire system at the telephoto end as ft, the following conditions are satisfied:

$1.5 \leq ft/fw$; and $1.75 < |f1|/f2 < 2.5$.

16. The zoom lens according to claim 1, wherein the eleventh first lens is a lens of negative refractive power of which the surface on the object side is a convex meniscus shape, and the second lens is a lens of positive refractive power of which the surface on the object side is a convex meniscus shape;
and wherein, with the curvature radii on the object side and on the image side of the first lens as R11 and R12 respectively, and the curvature radii on the object side and on the image side of the second lens as R13 and R14 respectively, the following conditions are satisfied:

$1.5 < |R11/R12|$; and $|R13/R14| < 1.2$.

17. The zoom lens according to claim 16, wherein with the Abbe numbers of the materials of the first lens and the second lens as v11 and v12 respectively, the following condition is satisfied:

$1.0 < v11/v12$.

18. The zoom lens according to claim 15, wherein the first lens is a lens of negative refractive power of which the surface on the object side is a convex meniscus shape, and the second lens is a lens of positive refractive power of which the surface on the object side is a convex meniscus shape, and wherein, with the curvature radii on the object side and on the image side of the first lens as R11 and R12 respectively, and the curvature radii on the object side and on the image side of the second lens as R13 and R14 respectively, the following conditions are satisfied:

$1.5 < |R11/R12|$; and $|R13/R14| < 1.2$.

19. The zoom lens according to claim 18, wherein with the Abbe numbers of the materials of the first lens and the second lens as v11 and v12 respectively, the following condition is satisfied:

$1.0 < v11/v12$.

20. The zoom lens according to claim 15, wherein the number of lenses in the entire system is less than eight.

21. The zoom lens according to claim 15, wherein back focus at the wide-angle end is less than 2.5 mm.

22. The zoom lens according to claim 15, wherein the distance from the first lens surface on the object side to the image surface is less than 17 mm.

23. An imaging apparatus comprising:
the zoom lens according to claim 15; and
a solid state imaging device configured to receive an image formed by the zoom lens.

* * * * *